United States Patent
Kobayashi et al.

(10) Patent No.: US 8,365,211 B2
(45) Date of Patent: Jan. 29, 2013

(54) DISK CARTRIDGE INCLUDING AN INNER ROTOR AND A SHUTTER

(75) Inventors: Daiki Kobayashi, Miyagi (JP); Isao Watanabe, Miyagi (JP); Yasuyuki Abe, Miyagi (JP)

(73) Assignee: Sony Corporation, Tokyo (JP)

( * ) Notice: Subject to any disclaimer, the term of this patent is extended or adjusted under 35 U.S.C. 154(b) by 499 days.

(21) Appl. No.: 12/596,956

(22) PCT Filed: Jan. 29, 2009

(86) PCT No.: PCT/JP2009/051412
§ 371 (c)(1),
(2), (4) Date: Oct. 21, 2009

(87) PCT Pub. No.: WO2009/104462
PCT Pub. Date: Aug. 27, 2009

(65) Prior Publication Data
US 2010/0064303 A1    Mar. 11, 2010

(30) Foreign Application Priority Data

Feb. 22, 2008   (JP) .................... 2008-040782
Feb. 22, 2008   (JP) .................... 2008-040793
Feb. 26, 2008   (JP) .................... 2008-044063

(51) Int. Cl.
*G11B 23/03* (2006.01)
(52) U.S. Cl. ............... 720/739; 720/741; 720/742
(58) Field of Classification Search ............... 360/133; 720/725, 732, 734–736, 738–743
See application file for complete search history.

(56) References Cited

U.S. PATENT DOCUMENTS
2006/0259919 A1 * 11/2006 Funawatari et al. .......... 720/741

FOREIGN PATENT DOCUMENTS

| EP | 1734532 | 12/2006 |
|---|---|---|
| JP | 2001-332057 | 11/2001 |
| JP | 2004-280933 | 10/2004 |
| JP | 2005-322386 | 11/2005 |
| JP | 2006-286133 | 10/2006 |

OTHER PUBLICATIONS

International Search Report dated Apr. 21, 2009, for corresponding Patent Application PCT/JP2009/051412.

(Continued)

*Primary Examiner* — Nathan Danielsen
(74) *Attorney, Agent, or Firm* — K&L Gates LLP

(57) ABSTRACT

A disk cartridge that has high durability with respect to a drop impact is provided. The disk cartridge includes: a disk-like recording medium; a cartridge case that rotatably accommodates the disk-like recording medium and is formed with a first opening that exposes a part of the disk-like recording medium; an inner rotor that is rotatably supported inside the cartridge case and includes a main surface portion formed with a second opening corresponding to the first opening; shutter members that are movable between a closing position at which the first opening is closed and an opening position at which the first opening is opened in accordance with a rotation of the inner rotor; and a buffer mechanism that is formed on the main surface portion of the inner rotor and includes rotary shafts that rotatably support the shutter members and elastic support portions that respectively support the rotary shafts and can be elastically deformed with respect to the main surface portion.

16 Claims, 20 Drawing Sheets

OTHER PUBLICATIONS

Japanese Patent Office, Notice of reasons for refusal issued in connection with Japanese Patent Application No. 2008-040782, dated May 29, 2012. (3 pages).

Japanese Patent Office, Notice of reasons for refusal issued in connection with Japanese Patent Application No. 2008-040793, dated May 29, 2012. (3 pages).

Japanese Patent Office, Notice of reasons for refusal issued in connection with Japanese Patent Application No. 2008-044063, dated Jun. 5, 2012. (4 pages).

European Search Report issued Oct. 9, 2012 for corresponding European Application No. 09713561.0.

* cited by examiner

DISK CARTRIDGE INCLUDING AN INNER ROTOR AND A SHUTTER

CROSS REFERENCE TO RELATED APPLICATIONS

The present application is a National Stage of International Application No. PCT/JP2009/051412 filed on Jan. 29, 2009 and which claims priority to Japanese Patent Application No. 2008-040782 filed on Feb. 22, 2008, Japanese Patent Application No. 2008-040793 filed on Feb. 22, 2008 and Japanese Patent Application No. 2008-044063 filed on Feb. 26, 2008, the entire contents of which are being incorporated herein by reference.

BACKGROUND

The present disclosure relates to a disk cartridge including an inner rotor that is rotatably supported inside a cartridge case and a shutter mechanism for opening and closing an opening formed in the cartridge case in accordance with a rotation of the inner rotor.

In recent years, a disk cartridge that rotatably accommodates a disk-like recording medium such as an optical disc, a magneto optical disc, and a magnetic disc is widely used. In general, a disk cartridge is capable of recording and/or reproducing information signals including music signals, video signals, and programs. As such a disk-like recording medium capable of recording information signals, there are known, for example, a writable write-once disc and a rewritable disc with which rewrite is possible.

For example, Patent Document 1 discloses a disk cartridge including a cartridge casing formed by superimposing a pair of shells, an inner rotor that forms a disk housing chamber inside the cartridge casing, an optical disc rotatably housed in the disk housing chamber, and a pair of shutter members for opening and closing an opening part provided to the cartridge casing in accordance with a rotation of the inner rotor.

In the conventional disk cartridge described above, the pair of shutter members include shaft portions that fit in support holes formed on a planar portion of the inner rotor. By fitting those shaft portions in the support holes, rotations about respective rotary shafts can be made. Moreover, the opening part of the cartridge casing is closed by the pair of shutter members being rotated in a direction in which they are brought close to each other, and the opening part is opened by the pair of shutter members being rotated in a direction in which they are set apart.

Patent Document 1: Japanese Patent Application Laid-open No. 2001-332057

However, in the conventional disk cartridge described above, when receiving a drop impact, for example, there is a fear that the shaft portions of the shutter members may come out of the support holes of the inner rotor. When an engagement operation between the inner rotor and the shutter members cannot be maintained as described above, it becomes impossible to perform desired rotation control on the shutter members, with the result that the disk cartridge becomes unusable.

On the other hand, there is a method of heat-caulking a tip end of the shaft portions of the shutter members fit in the support holes of the inner rotor for securing the engagement between the inner rotor and the shutter members. Since the tip end of the shaft portions is formed with an eave portion for preventing the shaft portions from being detached from the support holes due to the heat caulking, an engagement strength between the inner rotor and the shutter members can be enhanced.

However, the eave portion formed at the tip end of the shaft portions due to the heat caulking can hardly be said as having a sufficient strength, and, depending on a size of the impact to the disk cartridge, the eave portion may be damaged and the shutter members may thus be detached from the inner rotor. In this case, reliability of the disk cartridge is largely impaired.

Therefore, it is desired to provide a disk cartridge having high durability with respect to a drop impact.

SUMMARY

According to the another embodiment, there is provided a disk cartridge including a disk-like recording medium, a cartridge case, an inner rotor, a shutter, and a buffer mechanism.

The cartridge case rotatably accommodates the disk-like recording medium and is formed with a first opening that exposes a part of the disk-like recording medium.

The inner rotor is rotatably supported inside the cartridge case and includes a main surface portion formed with a second opening corresponding to the first opening.

The shutter is movable between a closing position at which the first opening is closed and an opening position at which the first opening is opened in accordance with a rotation of the inner rotor.

The buffer mechanism is formed on the main surface portion of the inner rotor and includes a rotary shaft that rotatably supports the shutter and an elastic support portion that supports the rotary shaft and can be elastically deformed with respect to the main surface portion.

In the cartridge case, due to the buffer mechanism, the rotary shaft that rotatably supports the shutter with respect to the inner rotor is elastically supported with respect to the inner rotor. Therefore, it becomes possible to relieve a stress applied to a coupling portion between the inner rotor and the shutter when a drop impact acts thereon and prevent the shutter from being detached from the inner rotor. Accordingly, durability of a shutter opening/closing mechanism with respect to a drop impact can be enhanced, and reliability of the disk cartridge can be improved.

The elastic support portion may be integrally formed with the main surface portion of the inner rotor. In this case, the elastic support portion can be sectioned from the main surface portion by a slit formed on the main surface portion of the inner rotor. With this structure, it becomes possible to easily form the elastic support portion on the main surface portion. It also becomes possible to impart a desired elastic force to the elastic support portion depending on the way the slit is formed.

The rotary shaft may be integrally formed with the elastic support portion at a tip end thereof. Accordingly, since elastic deformation performance of the shutter with respect to the inner rotor is improved, an impact that acts on the rotary shaft can be absorbed efficiently.

The disk cartridge may further include a first engagement portion formed at a tip end of the rotary shaft and a second engagement portion that is formed on the shutter and engages with the first engagement portion. The second engagement portion is detached from the first engagement portion in a state where the elastic support portion is elastically deformed a predetermined amount or more. The elastic deformation amount of the elastic support portion of a predetermined amount or more can be set to be an amount exceeding a maximum deformation amount of the elastic support portion inside the cartridge case. Accordingly, it becomes possible to constantly maintain an engagement relationship between the first engagement portion and the second engagement portion after the inner rotor and the shutter are incorporated in the cartridge case.

The second engagement portion may be formed on an inner circumferential portion of a hole into which the rotary shaft is inserted. Accordingly, the second engagement portion can engage with or cancel the engagement with the first engagement portion in a state where the elastic support portion is elastically deformed a predetermined amount or more.

The shutter may be constituted of a pair of shutter members that are rotatable between a first position at which the pair of shutter members constitute the closing position by being brought close to each other and a second position at which the pair of shutter members constitute the opening position by being set apart from each other. In this case, the buffer mechanism is integrally formed on the main surface portion in correspondence with the pair of shutter members. Accordingly, since the shutter members are prevented from being detached from the inner rotor, durability of the shutter opening/closing mechanism with respect to a drop impact can be enhanced, and reliability of the disk cartridge can be improved.

The disk cartridge may further include an engagement mechanism. The engagement mechanism is provided between the cartridge case and the shutter and maintains an engaged state between the cartridge case and the shutter when the shutter is positioned at the closing position. Accordingly, since a relative movement of the shutter with respect to the cartridge case is restricted when a drop impact acts thereon, a stress applied to the rotary shaft of the shutter can be reduced and the shutter can be prevented from being detached from the inner rotor. In addition, durability of the shutter opening/closing mechanism with respect to a drop impact can be enhanced, and reliability of the disk cartridge can be improved.

The engagement mechanism may cancel the engaged state between the cartridge case and the shutter while the shutter moves to the opening position from the closing position. Accordingly, a special mechanism for canceling the engagement between the cartridge case and the shutter becomes unnecessary, and it becomes possible to execute the engagement with respect to the cartridge case and the engagement cancel with respect to the cartridge case by a normal rotation operation of the shutter.

One embodiment of the engagement mechanism may include an engagement protrusion and an engagement groove. The engagement protrusion is formed on the shutter and has an arc shape corresponding to a rotational direction of the shutter. The engagement groove is formed at an edge portion of the first opening and has an arc shape capable of accommodating the engagement protrusion. Moreover, the engagement protrusion is provided in the vicinity of a rotational center of the shutter with respect to the inner rotor.

The inner rotor may include a toric circumferential wall portion and a coupling portion. The circumferential wall portion is formed on one surface of the main surface portion. The coupling portion is positioned at a portion where the second opening is formed in a part of the circumferential wall portion. The coupling portion includes a first end surface on the main surface portion side, that is formed with a first width, and a second end surface on the other side of the main surface portion side, that is formed with a second width smaller than the first width. In addition, the cartridge case includes a guide groove. The guide groove slidably engages with the coupling portion on the second end surface side and guides the rotation of the inner rotor with respect to the cartridge case. By thus enlarging a formation width of the coupling portion on the first end surface side, a mechanical strength of the coupling portion can be enhanced. As a result, durability of the coupling portion with respect to a drop impact can be enhanced, and reliability of the cartridge can be improved.

Further, the coupling portion is slidably engaged with the guide groove formed on an inner surface of the cartridge case together with the circumferential wall portion so that a rotation operation thereof with respect to the cartridge case is guided. By the coupling portion being engaged with the guide groove on the second end surface side, the present invention can be embodied without changing a groove width at a bottom portion of the guide groove. In this case, an inner surface of a side wall of the guide groove can be formed as a tapered or curved surface that corresponds to a cross-sectional shape of the coupling portion.

The guide groove may have an inner surface configuration corresponding to an outer surface configuration of the coupling portion. As one embodiment, the coupling portion includes an outer circumferential surface and an inner circumferential surface, and at least one of the outer circumferential surface and the inner circumferential surface is formed as a tapered or curved surface. Accordingly, the first end surface can be formed with a wider width than the second end surface.

Furthermore, according to another embodiment, there is provided a disk cartridge including: a disk-like recording medium; a cartridge case that rotatably accommodates the disk-like recording medium and is formed with a first opening that exposes a part of the disk-like recording medium; an inner rotor that is rotatably supported inside the cartridge case and includes a second opening corresponding to the first opening; a shutter that is movable between a closing position at which the first opening is closed and an opening position at which the first opening is opened in accordance with a rotation of the inner rotor; and a buffer mechanism that is formed on a main surface of the shutter and includes a rotary shaft that rotatably supports the shutter with respect to the inner rotor and an elastic support portion that supports the rotary shaft and can be elastically deformed with respect to the main surface.

Also with this structure, an operation and effect that are the same as those described above can be obtained.

As described above, according to the embodiment, since a shutter can be effectively prevented from being detached from an inner rotor, durability with respect to a drop impact can be enhanced, and reliability of a disk cartridge can be improved.

Additional features and advantages are described herein, and will be apparent from, the following Detailed Description and the figures.

DETAILED DESCRIPTION

Hereinafter, embodiments will be described with reference to the drawings.

Figure 1:
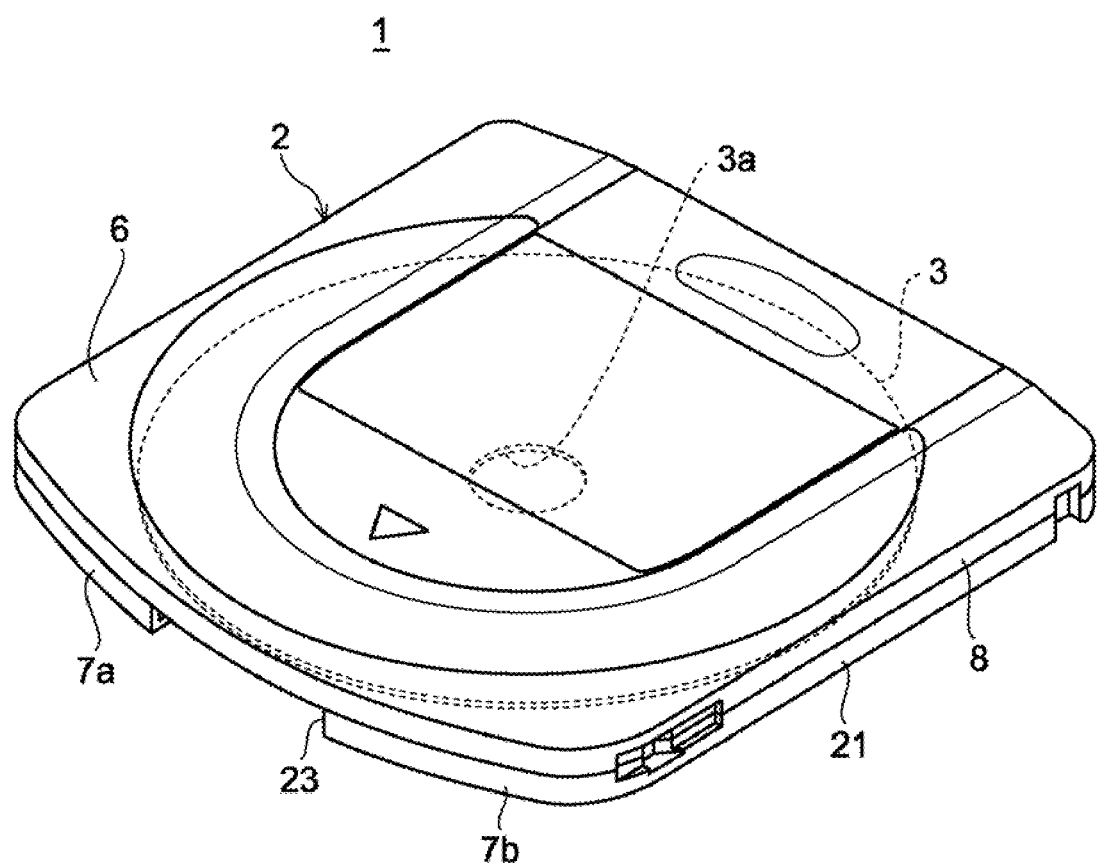
FIG. 1 A perspective view of a disk cartridge according to an embodiment of the present invention seen from an upper shell side.
Figure 2:
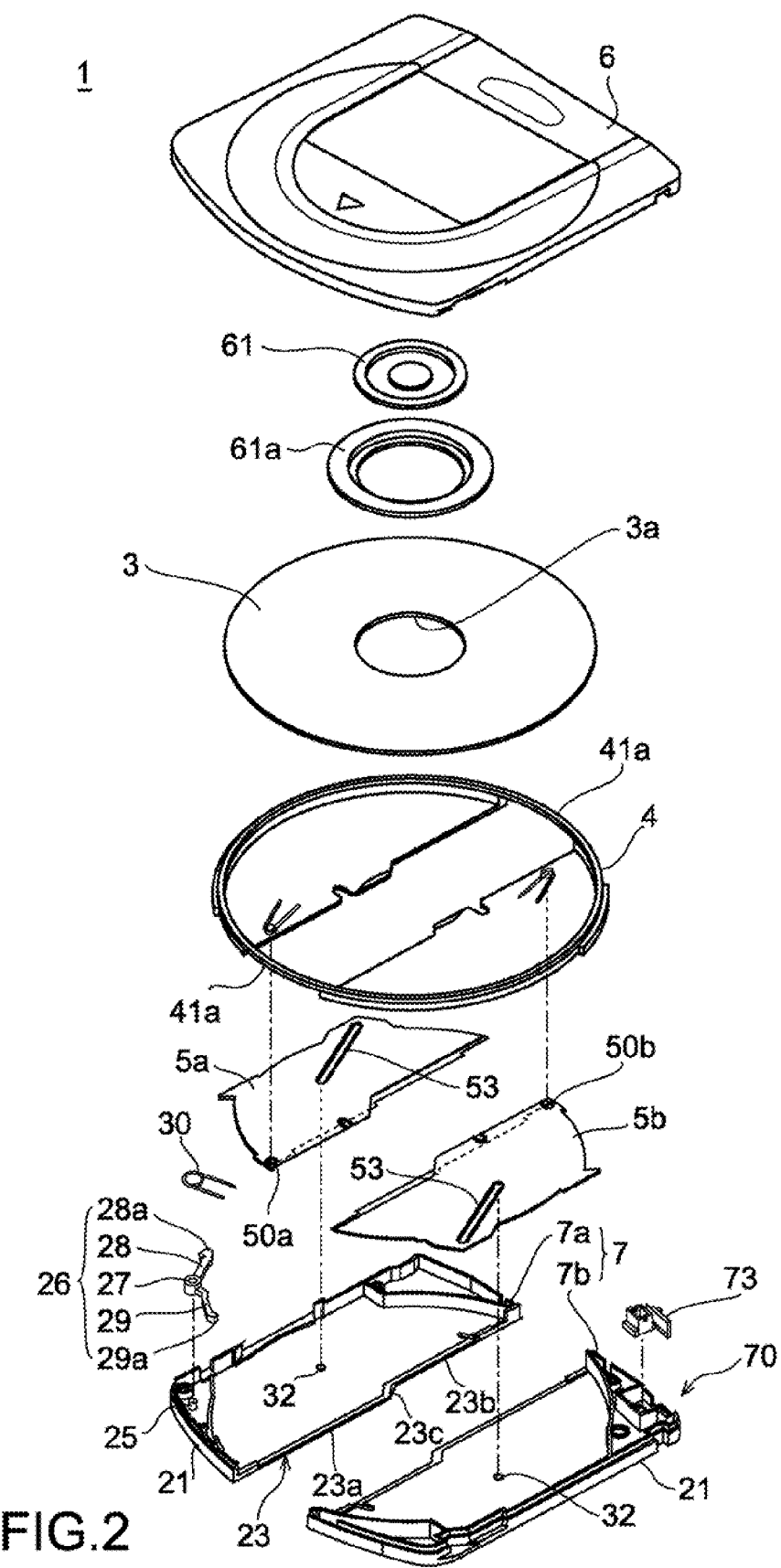
FIG. 2 An exploded perspective view of the disk cartridge.
Figure 3:
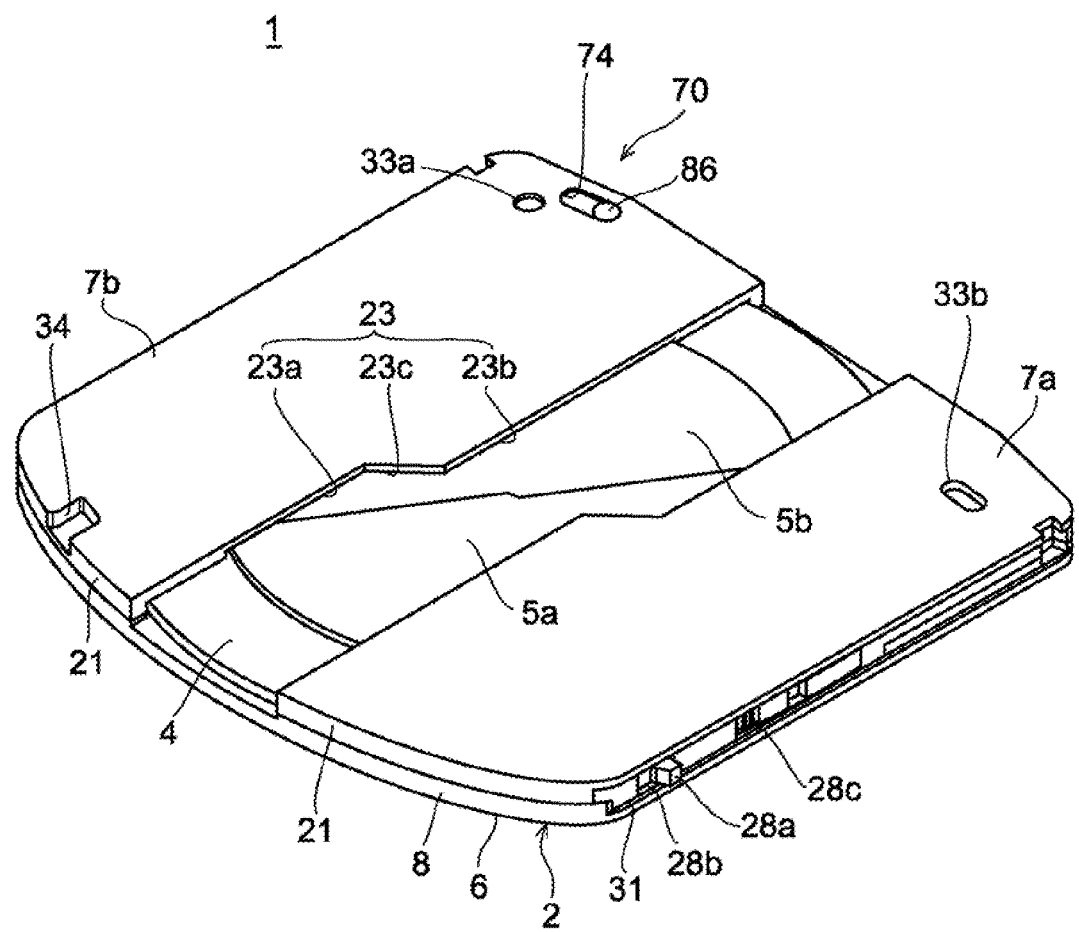
FIG. 3 A perspective view of the disk cartridge seen from a lower shell side.

FIGS. 1 to 3 each show an entire disk cartridge according to an embodiment. Specifically, FIG. 1 is a perspective view of the disk cartridge seen from an upper shell side, FIG. 2 is an exploded perspective view of the disk cartridge, and FIG. 3 is a perspective view of the disk cartridge seen from a lower shell side.

A disk cartridge 1 of this embodiment is structured to rotatably accommodate an optical disc 3 in a cartridge case 2. Specifically, the disk cartridge 1 includes, inside the cartridge case 2, the optical disc 3, an inner rotor (intermediate shell) 4, and a pair of shutter members 5a and 5b.

As shown in FIG. 2, the optical disc 3 includes, at a center portion thereof, a center hole 3a that engages with a disc rotary-drive mechanism on a recording/reproducing apparatus side. Various disk-like recording media can be exemplified as the optical disc 3. As a disk-like recording medium, a reproduction-only optical disc on which various information signals such as music signals as audio information, picture signals as video signals, and music signals are recorded in advance can be exemplified. In addition to that, as the disk-like recording medium, a write-once optical disc in which those information signals can be written only once and a rewritable optical disc in which information can be repeatedly rewritten can be exemplified. It should be noted that as the disk-like recording medium, in addition to the optical disc 3 described above, a magneto optical disc and a magnetic disc can be exemplified.

Regarding the optical disc 3, optical beams having a wavelength of about 400 nm can be used in recording and/or reproducing information, and an objective lens having a higher numerical aperture than an objective lens used for a CD or a DVD can be used as an optical pickup objective lens. Accordingly, still image data, moving image data, melodic data, processing data processed by a computer, and the like can be recorded with a higher density than in the case of a CD or a DVD.

As shown in FIG. 3, the disk cartridge 1 of this embodiment is formed with, on a bottom surface of the cartridge case 2 from a foreside to a rear side thereof, a first opening 23 for recording and/or reproduction. The first opening 23 enables recording or reproduction with respect to the optical disc 3 to be carried out using two optical pickups by exposing a part of a signal recording surface of the optical disc 3 when the disk cartridge 1 is mounted to a mount portion of the recording/reproducing apparatus, and causing the optical pickups to enter the cartridge case 2 from both the foreside and the rear side thereof. As a result, an increase in a speed in recording or reading out information signals can be realized.

Figure 4:
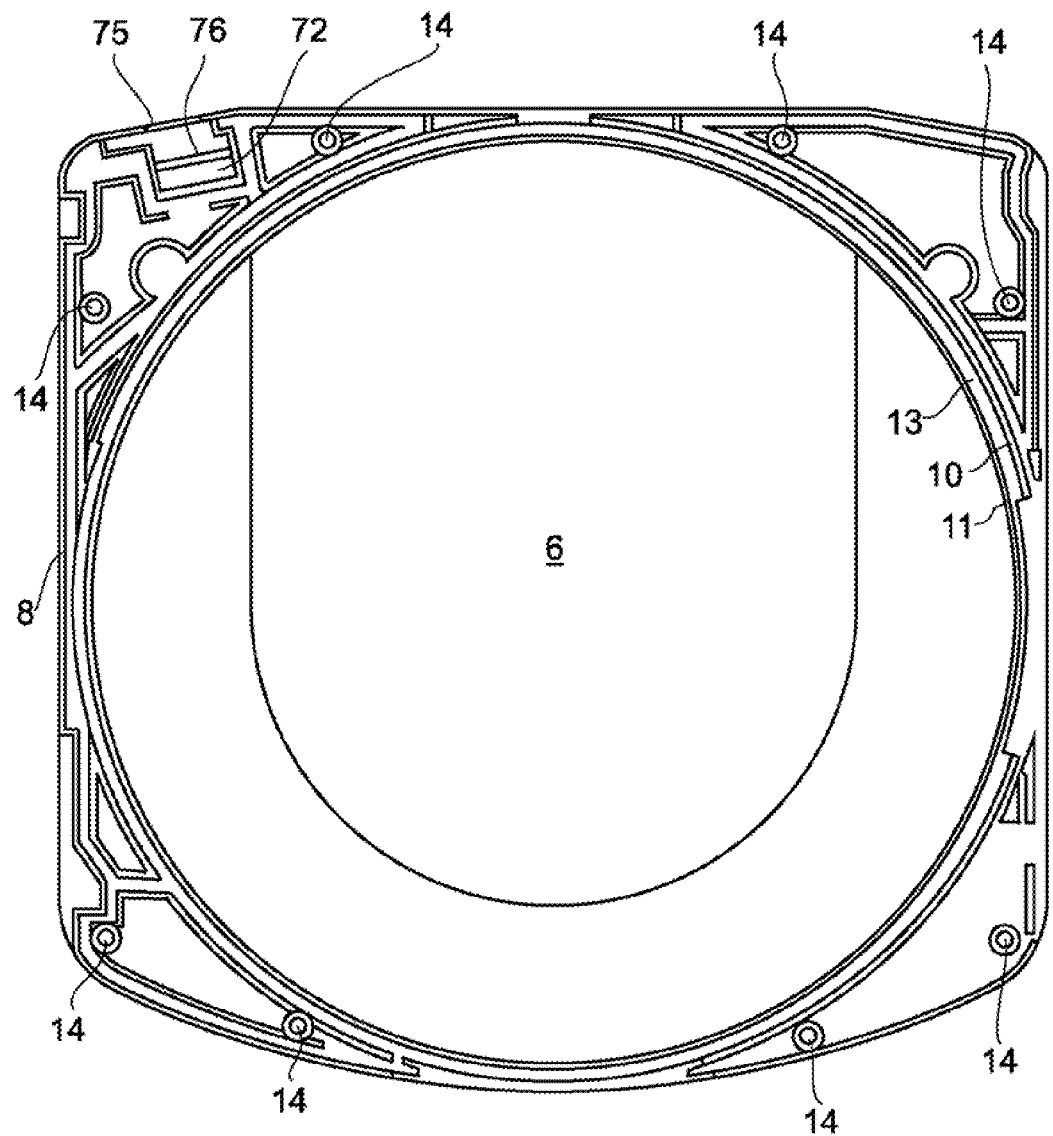
FIG. 4 A plan view of an inner surface side of the upper shell constituting the disk cartridge.
Figure 5:
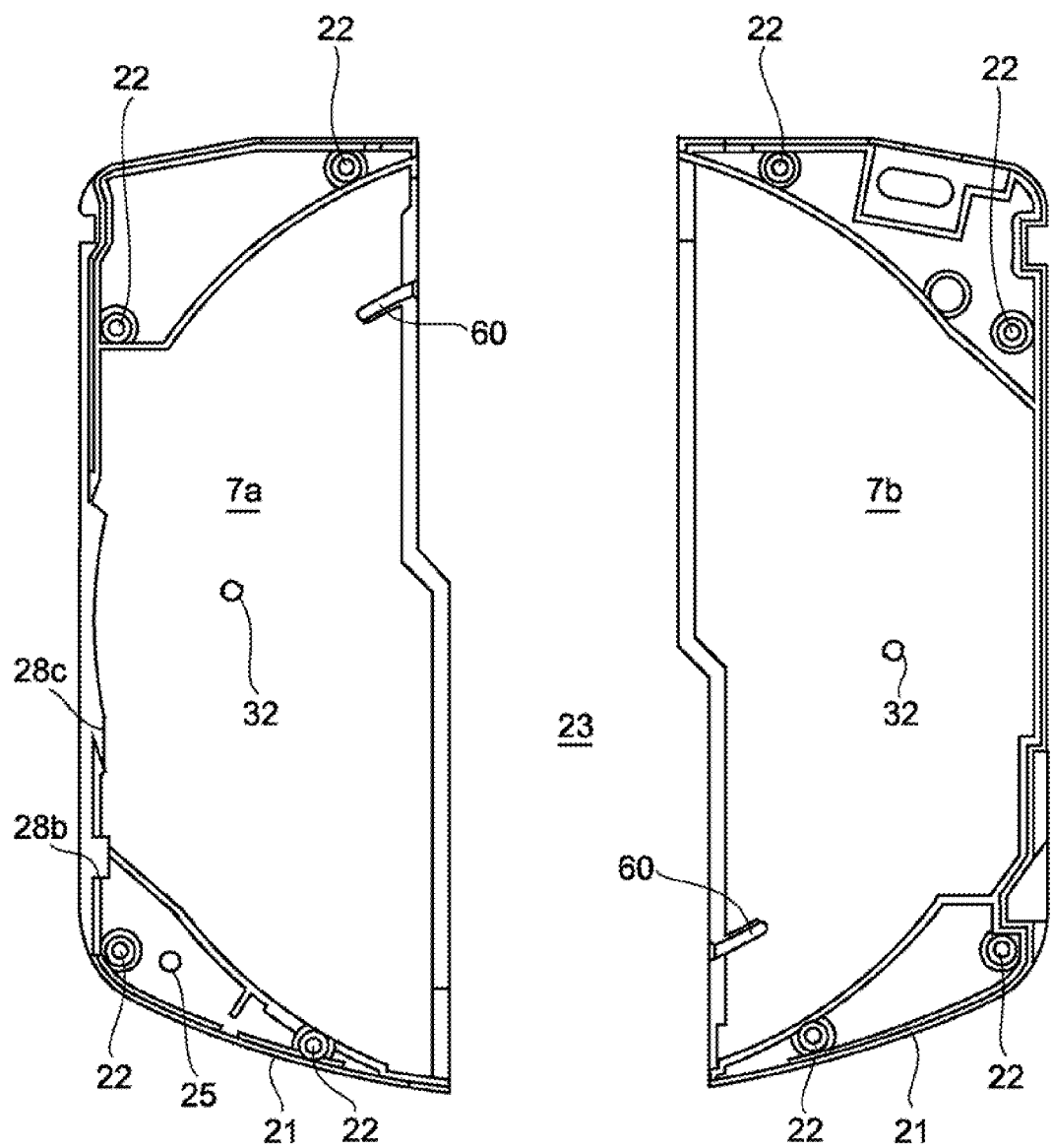
FIG. 5 A plan view of an inner surface side of the lower shell constituting the disk cartridge.

The cartridge case 2 is constituted of an upper shell 6 and a lower shell 7 (7a, 7b) that is divided into two and brought together with the upper shell 6. FIG. 4 is a bottom view showing an inner structure of the upper shell 6, and FIG. 5 is a plan view showing an inner structure of the lower shell 7.

The upper shell 6 constituting an upper surface of the cartridge case 2 is formed by injection-molding a thermoplastic resin material such as acrylonitrile butadiene styrene (ABS) and polycarbonate. As shown in FIG. 4, the upper shell 6 is formed such that, out of a main surface formed substantially rectangularly as a whole, a foreside thereof on an insertion end side with respect to the recording/reproducing apparatus is formed substantially as an arc. Moreover, in the upper shell 6, an outer circumferential wall 8 constituting a side surface of the cartridge case 2 is formed along an outer circumferential edge portion of the main surface.

Further, on an inner circumferential side of the outer circumferential wall 8, a nearly-toric inner circumferential wall 11 that constitutes a disc accommodation portion for rotatably accommodating the optical disc 3 is formed. The inner circumferential wall 11 constitutes a side wall of the disc accommodation portion for accommodating the optical disc 3 together with the inner rotor 4.

On an outer circumferential side of the inner circumferential wall 11, an erected wall 10 is formed so as to surround the inner circumferential wall 11. A guide groove 13 that is substantially toric is formed between the inner circumferential wall 11 and the erected wall 10. The inner rotor 4 is rotatably engaged with the guide groove 13.

Further, in the vicinity of corner portions of the upper shell 6, a plurality of positioning pins 14 used to couple the lower shell 7 are formed. At a center portion of each of the positioning pins 14, a screw hole for screwing is formed.

On the other hand, the lower shell 7 includes semi-shell bodies 7a and 7b obtained by diving the lower shell 7 into two as shown in FIGS. 2, 3, and 5. By being coupled to the upper shell 6, the semi-shell bodies 7a and 7b constitute a bottom surface of the cartridge case 2. It should be noted that in descriptions below, the semi-shell bodies 7a and 7b will also be collectively referred to as lower shell 7.

Similar to the upper shell 6 described above, the lower shell 7 is formed by injection-molding a thermoplastic resin material such as acrylonitrile butadiene styrene (ABS) and polycarbonate. Foresides of the semi-shell bodies 7a and 7b are formed substantially as an arc so as to correspond to the approximate arc shape of the upper shell 6 on the foreside. In the semi-shell bodies 7a and 7b, an outer circumferential wall 21 constituting a side surface of the cartridge case 2 is formed along an outer circumferential edge of a main surface.

Furthermore, corner walls 24 that are approximately an arc are formed at respective corner portions of the lower shell 7. The corner walls 24 are structured to be positioned on an outer side of the inner circumferential wall 11 of the upper shell 6 when the semi-shell bodies 7a and 7b are brought together with the upper shell 6. Accordingly, foreign substances can effectively be prevented from entering the disk accommodation portion.

Nearly-cylindrical positioning concave portions 22 to which the positioning pins 14 of the upper shell 6 described above are respectively fit, are formed protrusively on the lower shell 7. At a bottom surface portion of each of the positioning concave portions 22, a through-hole into which a screw is inserted is formed. The upper shell 6 and the semi-shell bodies 7a and 7b of the lower shell 7 are coupled by bringing the outer circumferential wall 8 on the upper shell 6 side and the outer circumferential wall 21 of the semi-shell bodies 7a and 7b constituting the lower shell 7 together, fitting the positioning pins 14 on the upper shell 6 side in the positioning concave portions 22 on the lower shell 7 side, and screwing a screw in each of the screw holes of the positioning pins 14 via the through-holes of the positioning concave portions 22. Accordingly, the cartridge case 2 is constituted.

The cartridge case 2 is formed with, between the semi-shell bodies 7a and 7b constituting the lower shell 7 on a bottom surface thereof, a first opening 23 for recording and/or reproduction that first and second optical pickups of the recording/reproducing apparatus and a disk table that constitutes a disc rotary-drive mechanism of the recording/reproducing apparatus enter. The first opening 23 is constituted of an opening 23a that the first optical pickup on the recording/reproducing apparatus side enters from a foreside of the cartridge case 2, an opening 23b that the second optical pickup on the recording/reproducing apparatus side enters from the rear side of the cartridge case 2, and an opening 23c for disc rotary drive provided at substantially the center portion of the bottom surface of the cartridge case 2 between the opening 23a and the opening 23b. Specifically, the openings 23a and 23b are formed to be large enough for the first and second optical pickups of the recording/reproducing apparatus to enter the cartridge case 2, and the opening 23c for rotary drive is formed to be large enough for the disk table constituting the disc rotary-drive mechanism of the recording/reproducing apparatus to enter the cartridge case 2.

Further, as shown in FIG. 2, the cartridge case 2 is attached with a lock member 26 at a corner portion on the foreside of the semi-shell body 7a constituting the lower shell 7. The lock member 26 locks the rotation of the inner rotor 4 when the inner rotor 4 and the pair of shutter members 5a and 5b to be described later are positioned at a closing position at which the first opening 23 of the cartridge case 2 is closed. Specifically, the lock member 26 includes a shaft hole 27 that is rotatably engaged with a support shaft 25 formed at the corner portion on the foreside of the semi-shell body 7a constituting the lower shell 7, an operation piece 28 elongated toward one of the side surface portions of the cartridge case 2 from the shaft hole 27, and a lock piece 29 elongated toward the inner rotor 4 side from the shaft hole 27.

As shown in FIGS. 2 and 5, at a tip end portion of the operation piece 28, an operation protrusion 28a exposed from a lock opening 28b formed on one of the side surface portions of the cartridge case 2 is provided. Moreover, at a tip end portion of the lock piece 29, a lock protrusion 29a that is in sliding contact with a ring portion 41 of the inner rotor 4 is provided.

Figure 6:
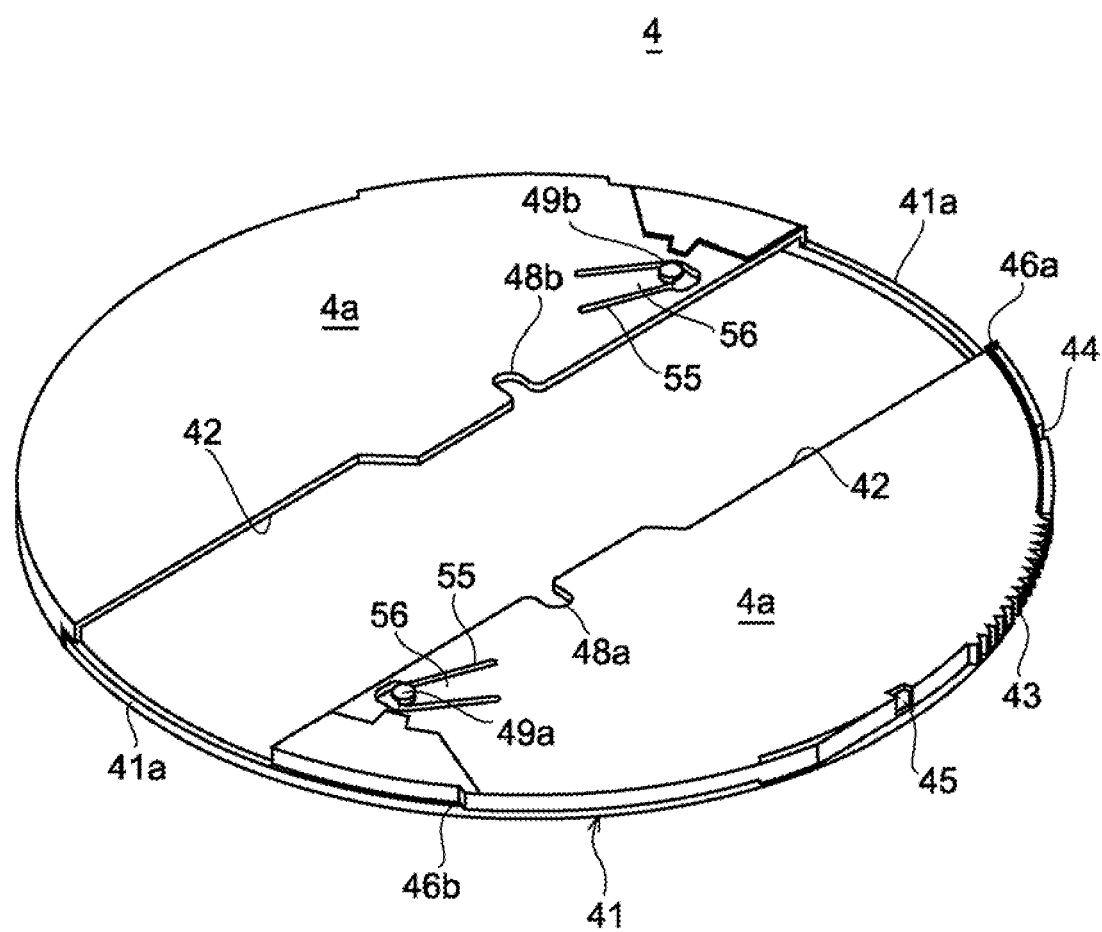
FIG. 6 A perspective view of an inner rotor constituting the disk cartridge.

To the support shaft 25 attached with the lock member 26 as described above, a bias member 30 such as a torsion coil spring is also attached. One arm of the bias member 30 is locked to the outer circumferential wall 21, and the other arm is locked to the lock member 26. Accordingly, the lock protrusion 29a is rotationally biased toward the inner rotor 4 side to engage with a second engagement concave portion 45 of the inner rotor 4 (FIG. 6). Then, by the operation protrusion 28a of the operation piece 28 being pressed, the lock member 26 is moved in a direction in which the lock piece 29 moves farther away from the ring portion 41 of the inner rotor 4 against the bias force of the bias member 30, and the engaged state between the lock protrusion 29a and the second engagement concave portion 45 is thus canceled.

Furthermore, as shown in FIG. 3, on one of the side surface portions of the cartridge case 2, a guide groove 31 for preventing erroneous insertion of the disk cartridge 1 into the recording/reproducing apparatus is formed from the foreside to the rear side. At a bottom surface portion of the guide groove 31, the lock opening 28b from which the operation protrusion 28a of the lock member 26 described above is exposed and a rotor opening 28c from which a part of an outer circumferential portion of the inner rotor 4 is exposed are formed in the stated order from the foreside.

As shown in FIG. 2, on an inner surface of the lower shell 7, guide pins 32 that respectively engage with guide holes 53 provided as long holes on the shutter members 5a and 5b to be described later are formed protrusively in a nearly-cylindrical shape. The guide pins 32 move along the guide holes 53 in accordance with the rotation of the inner rotor 4 and thus causes the shutter members 5a and 5b to respectively rotate about shaft holes 50a and 50b.

On the bottom surface of the cartridge case 2 that the lower shell 7 constitutes, a plurality of positioning holes 33a and 33b used for positioning at a time of mounting to the recording/reproducing apparatus are provided as shown in FIG. 3. The positioning hole 33a as one of the holes is a perfect circle and functions as a location hole, whereas the positioning hole 33b as the other hole is an oval and functions as an alignment hole. Moreover, a concave portion 34 having the foreside and the bottom surface opened is provided at one of the corner portions on the foreside of the cartridge case 2, thus being an identification portion with respect to a disk cartridge having substantially the same outer shape but a different recording format. It is of course also possible to cause the concave portion 34 to function as an insertion guide groove or a positioning groove by engaging a guide pin therewith at a time of insertion to the recording/reproducing apparatus.

Figure 7:
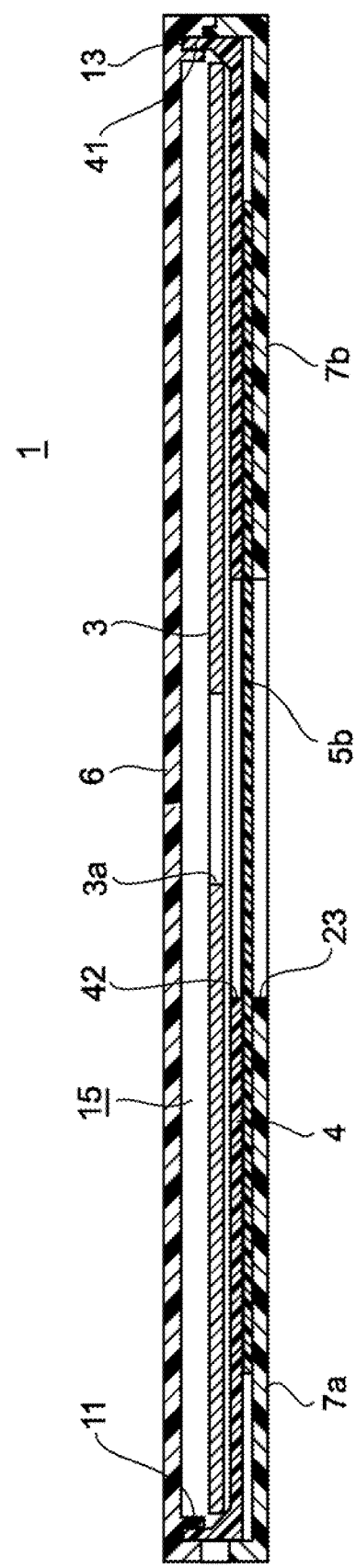
FIG. 7 A cross-sectional diagram of the disk cartridge.

Next, a structure of the inner rotor 4 will be described. FIG. 6 is a perspective view of the inner rotor 4 seen from the bottom surface side. Moreover, FIG. 7 is a cross-sectional diagram showing main portions of the disk cartridge 1.

The inner rotor 4 is formed by injection-molding a thermoplastic resin material such as polyoxymethylene (POM). On a main surface portion 4a of the inner rotor 4, the optical disc 3 is placed so as to face a signal recording surface 3a. When the main surface portion 4a is placed inside the cartridge main body 2 as shown in FIG. 7, the inner circumferential wall 11 of the upper shell 6 and the main surface portion 4a of the inner rotor 4 constitute a disk accommodation portion 15 (FIG. 7).

The inner rotor 4 is formed to be substantially circular as shown in FIG. 6 and formed with, on an outer circumferential edge portion thereof, a nearly-toric ring portion (circumferential wall portion) 41 that engages with the guide groove 13 of the upper shell 6 described above. By the ring portion 41 engaging with the guide groove 13 of the upper shell 6, the inner rotor 4 is rotatably supported inside the cartridge case 2.

As shown in FIG. 6, the inner rotor 4 is formed with a second opening 42 almost the same size as the first opening 23 formed on the lower shell 7. An area of the ring portion 41 where the second opening 42 is provided is constituted as a coupling portion 41a. The coupling portion 41a includes a first end surface positioned on the main surface portion 4a side of the inner rotor 4 and a second end surface positioned on the other side of the main surface portion 4a. The coupling portion 41a is engaged with the guide groove 13 on the second end surface side thereof.

Figure 22:
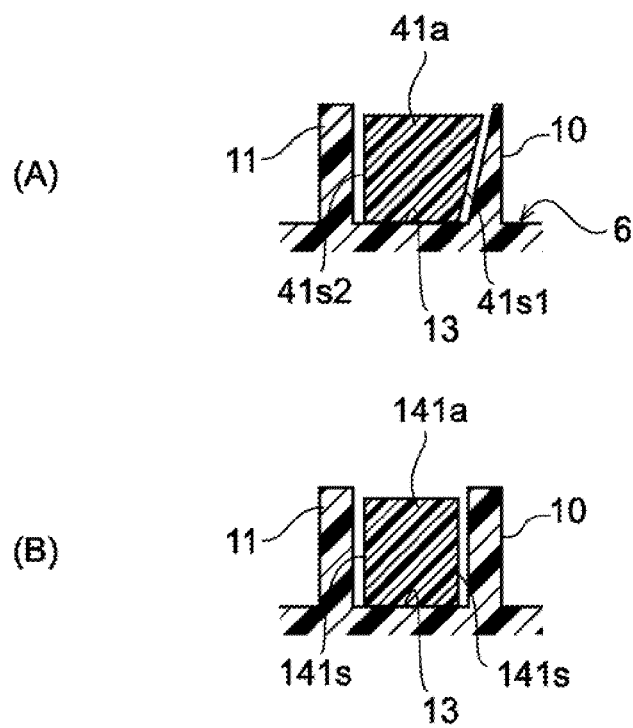
FIG. 22 Cross-sectional diagrams of a coupling portion of the inner rotor engaged with the guide groove of the cartridge case.

FIG. 22(A) is a cross-sectional diagram of the coupling portion 41a engaged with the guide groove 13. FIG. 22(B) is a similar cross-sectional diagram of a coupling portion 141a of a conventional structure illustrated as a comparative example. The conventional coupling portion 141a is formed such that an upper surface (first end surface) and a lower surface (second end surface) in the figure have the same width, and side surfaces 141s on inner and outer circumferences are formed to be vertical with respect to the main surface of the upper shell 6.

On the other hand, the coupling portion 41a of this embodiment in the figure is formed such that an upper surface (first end surface) is wider than a lower surface (second end surface). Specifically, a side surface 41s1 on an outer circumferential side of the coupling portion 41a is tapered and a side surface 41s2 on an inner circumferential side is formed to be vertical. Since a formation width of the lower surface (second formation width) is the same as a formation width of the lower surface of the conventional coupling portion 141a, a sectional area of the coupling portion 41a is larger than that of the conventional coupling portion 141a. As a result, the coupling portion 41a of this embodiment has a larger mechanical strength than the coupling portion 141a having the conventional structure, and durability with respect to a drop impact is thus enhanced as compared to the conventional art.

Moreover, since the sectional area of the coupling portion 41a is increased, moldability of the coupling portion 41a can also be enhanced. Consequently, the inner rotor 4 can be molded with desired form accuracy.

In addition, since the lower surface of the coupling portion 41a is formed with the same width as that of the conventional coupling portion 141a, the upper shell 6 can be formed without changing a groove width at the bottom portion of the guide groove 13. Accordingly, since it becomes unnecessary to widen a formation interval between the inner circumferential wall 11 and the erected wall 10, it is possible to prevent lowering of the strength of the upper shell 6. In this case, a sectional shape of the guide groove 13 can be made to correspond to a sectional shape of the coupling portion 41a. In the example of FIG. 22(A), an inner circumferential surface of the erected wall 10 on the outer circumferential side is tapered. As a result, the coupling portion 41a can be stably retained in the guide groove 13.

Figure 23:
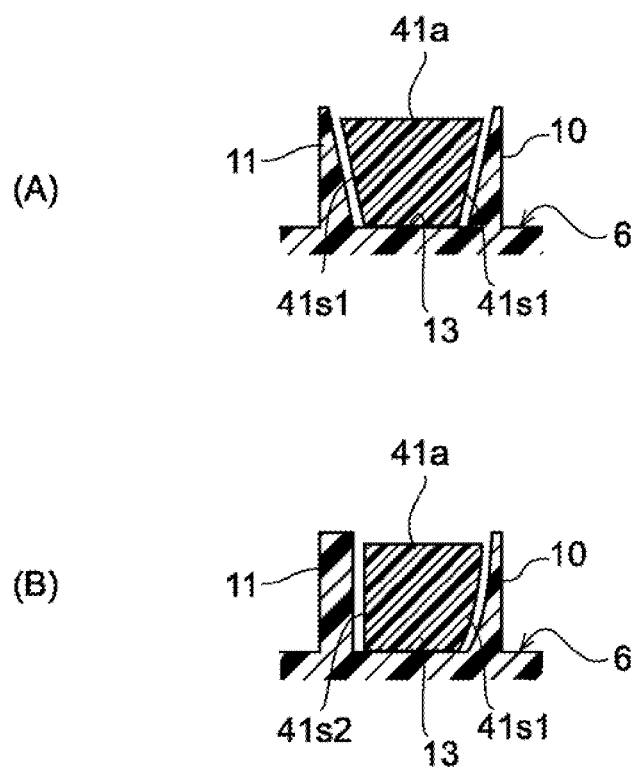
FIG. 23 Cross-sectional diagrams showing another structural example of the coupling portion of the inner rotor.

FIG. 23 are cross-sectional diagrams showing modified examples of the shapes of the coupling portion 41a and guide groove 13. FIG. 23(A) shows an example in which both the side surfaces 41s1 and 41s2 on the inner and outer circumferences of the coupling portion 41a are formed to be inversely tapered (undercut), and FIG. 23(B) shows an example in which the side surface 41s1 on the outer circumferential side of the coupling portion 41a is formed as a curved surface. In either case, the upper surface side of the coupling portion 41a can be formed with a larger width than the lower surface side. Moreover, a side wall surface of the guide groove 13 is formed to be tapered or formed as a curved surface in accordance with the sectional shape of the coupling portion 41a.

It should be noted that a height dimension of the coupling portion 41a is smaller than a depth dimension of the guide groove 13 so as not to interfere with a path of an optical pickup that enters the first opening 23.

Figure 8:
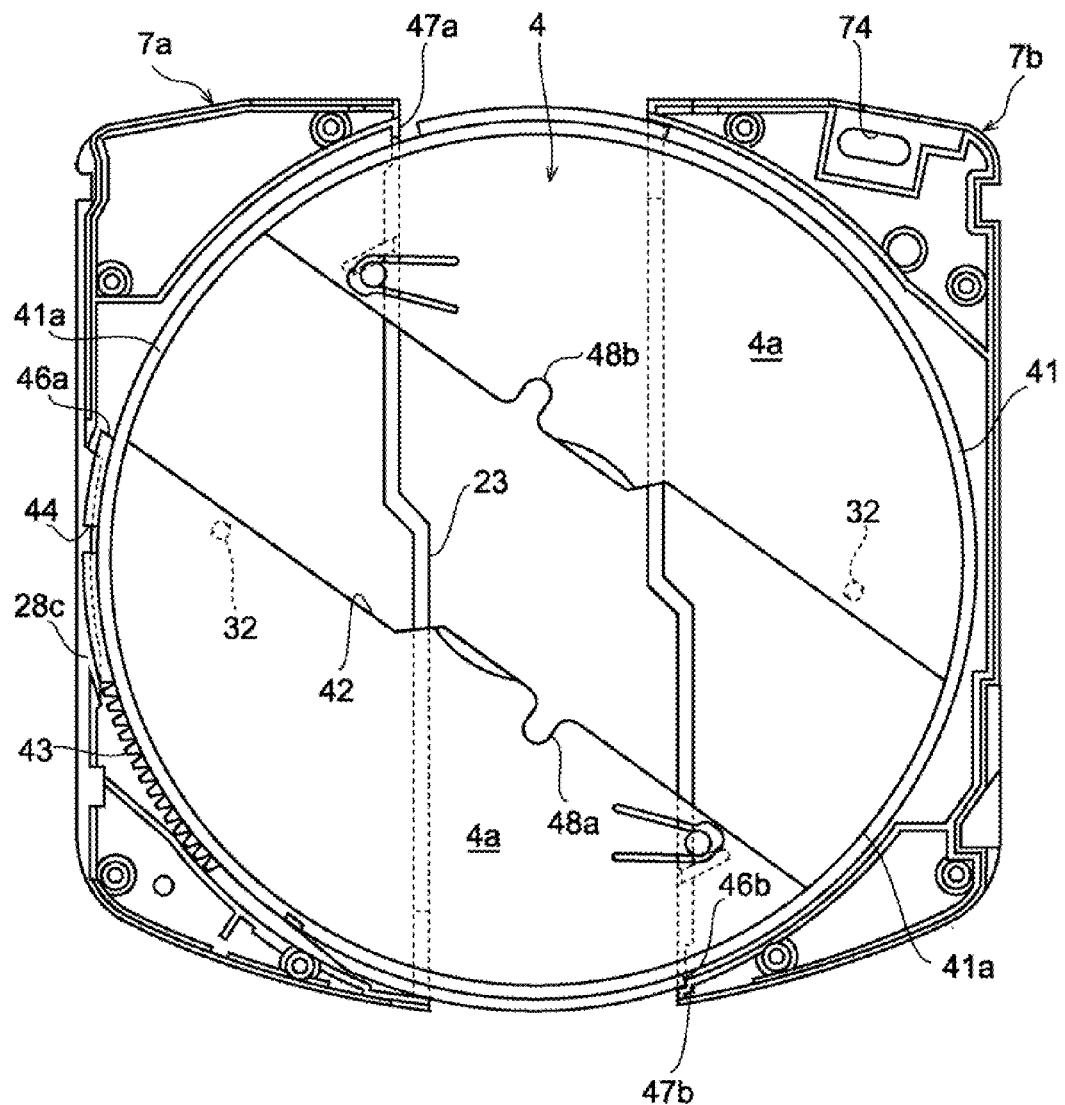
FIG. 8 A plan view showing a state where the inner rotor is rotated in a direction in which an opening of the lower shell is closed.
Figure 9:
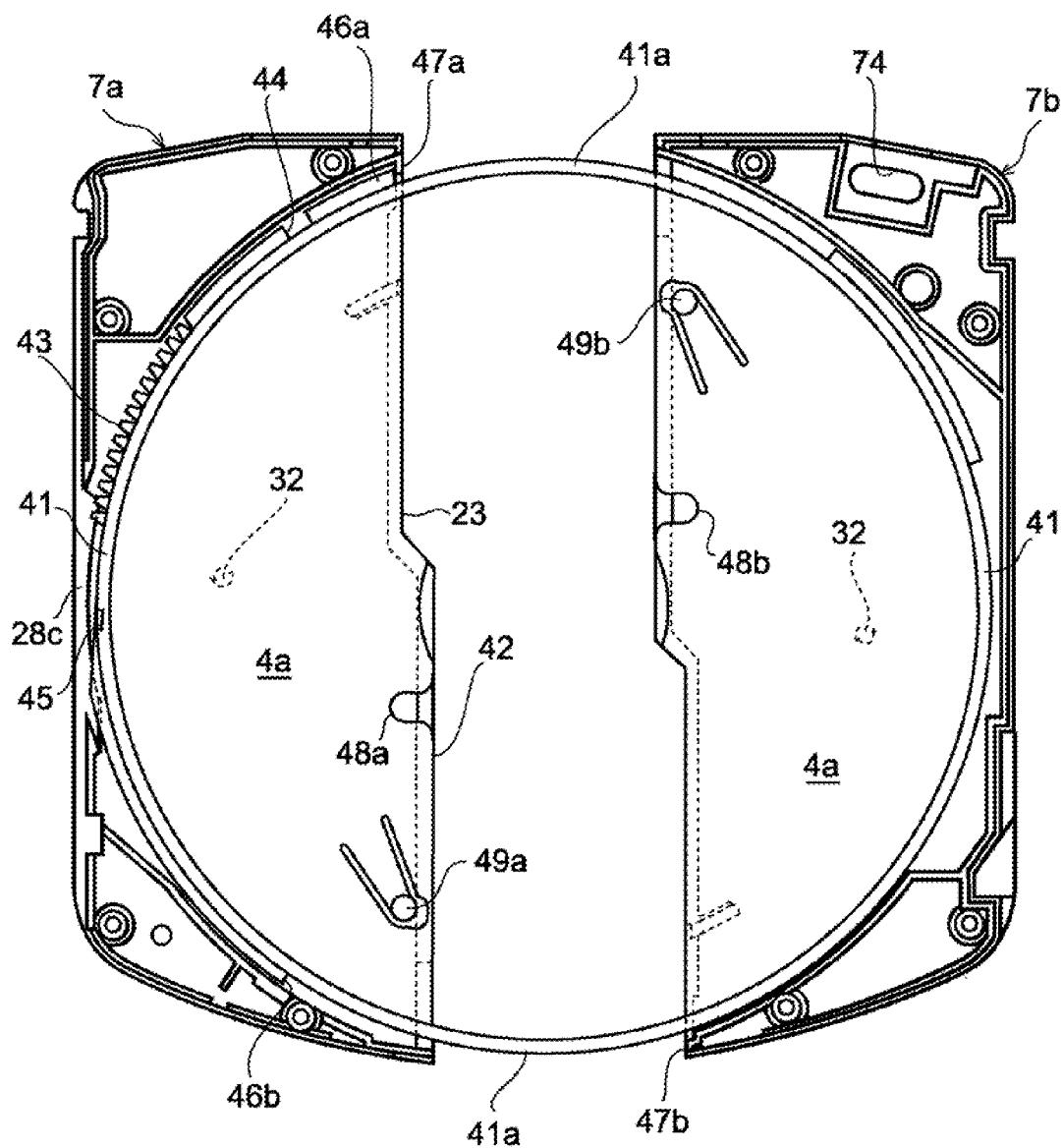
FIG. 9 A plan view showing a state where the inner rotor is rotated in a direction in which the opening of the lower shell is opened.

FIG. 8 is a plan view showing a state where the inner rotor 4 is rotated in a direction in which the opening 23 of the lower shell 7 is closed, and FIG. 9 is a plan view showing a state where the inner rotor 4 is rotated in a direction in which the opening 23 of the lower shell 7 is opened.

On an outer circumferential surface of the ring portion 41, a gear portion 43 for rotating the inner rotor 4 is formed. As shown in FIG. 8, the gear portion 43 is formed across an area between a position at which, when the inner rotor 4 is at the closing position of the first opening 23 of the lower shell 7, it is exposed from the foreside of the rotor opening 28c described above, and a position at which, when the inner rotor 4 is at the opening position shown in FIG. 9 at which the first opening 23 of the lower shell 7 is opened, it is exposed from the rear side of the rotor opening 28c described above.

As shown in FIG. 6, a first engagement concave portion 44 that engages with a first engagement protrusion of a shutter opening member constituting a shutter opening mechanism on the recording/reproducing apparatus side is formed on one side of the gear portion 43, and a second engagement concave portion 45 that engages with a second engagement protrusion of the shutter opening member is formed on the other side of the gear portion 43. Those engagement concave portions 44 and 45 are exposed from the rotor opening 28c together with the gear portion 43. The first engagement concave portion 44 is first engaged with the first engagement protrusion of the shutter opening member when the disk cartridge 1 is loaded in the recording/reproducing apparatus. The second engagement concave portion 45 is engaged with the lock protrusion 29a of the lock member 26 when the shutter members 5a and 5b to be described later are at the closing position and engaged with the second engagement protrusion of the shutter opening member when the shutter members 5a and 5b are at the opening position of the first and second openings 23 and 42.

Further, on the outer circumferential surface of the ring portion 41, a pair of rotation restriction protrusions 46a and 46b for restricting a rotational amount of the inner rotor 4 are formed protrusively with a predetermined gap therebetween. On the other hand, the lower shells 7a and 7b are respectively formed with a pair of restriction portions 47a and 47b that come into contact with the rotation restriction protrusions 46a and 46b.

As shown in FIG. 9, by the inner rotor 4 rotating in the direction in which the first opening 23 is opened and the rotation restriction protrusion 46a being brought into contact with the restriction portion 47a, further rotations of the inner rotor 4 are restricted. When the rotation of the inner rotor 4 in this direction is restricted, the inner rotor 4 is at the opening position of the first opening 23 and the second opening 42 of the inner rotor 4 practically coincides with the first opening 23 as shown in FIG. 9.

On the other hand, as shown in FIG. 8, by the inner rotor 4 rotating in the direction in which the first opening 23 is closed and the rotation restriction protrusion 46b being brought into contact with the restriction portion 47b, further rotations of the inner rotor 4 are restricted. When the rotation of the inner rotor 4 in this direction is restricted, the inner rotor 4 is at the closing position of the first opening 23 and the second opening 42 is tilted maximumly with respect to the first opening 23.

Further, as shown in FIG. 6, on the inner rotor 4, a pair of support shafts 49a and 49b that rotatably support the pair of shutter members 5a and 5b, respectively, are formed protrusively on a surface of the main surface portion 4a on the other side of the side on which the ring portion 41 protrudes. The pair of support shafts 49a and 49b are disposed at positions symmetrical with respect to a point at a center portion of the inner rotor 4, that is, disposed so as to have a phase difference of 180°.

The pair of shutter members 5a and 5b attached to the inner rotor 4 for opening and closing the second opening 42 as described above are mutually symmetric as shown in FIGS. 10 to 12 and rotatably attached to the pair of support shafts 49a and 49b of the inner rotor 4 while having a phase difference of 180°. It should be noted that parts common to the pair of shutter members 5a and 5b will be denoted by the same reference numerals, and detailed descriptions thereof will be omitted.

Figure 10:
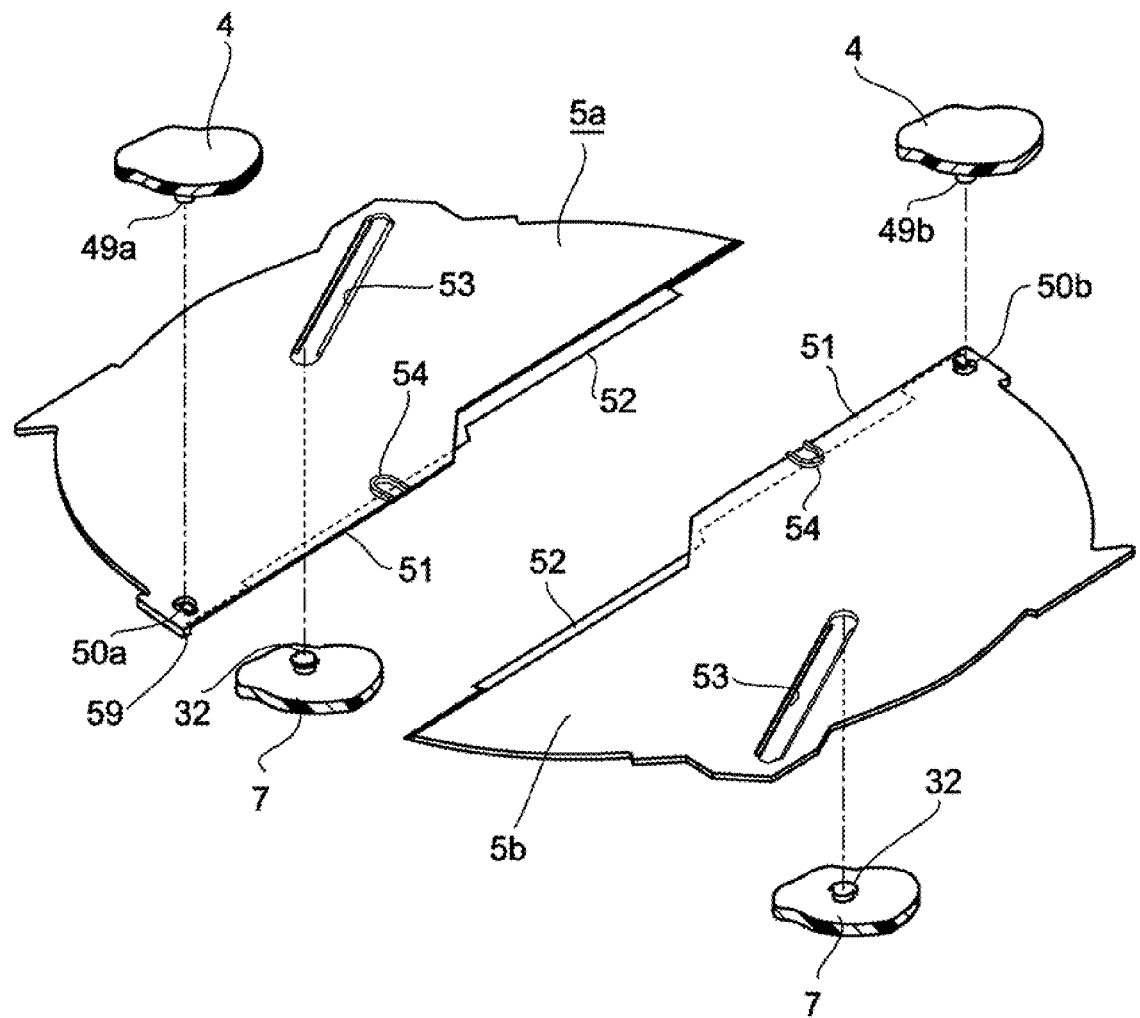
FIG. 10 A perspective view of a pair of shutter members constituting a shutter of the disk cartridge.
Figure 11:
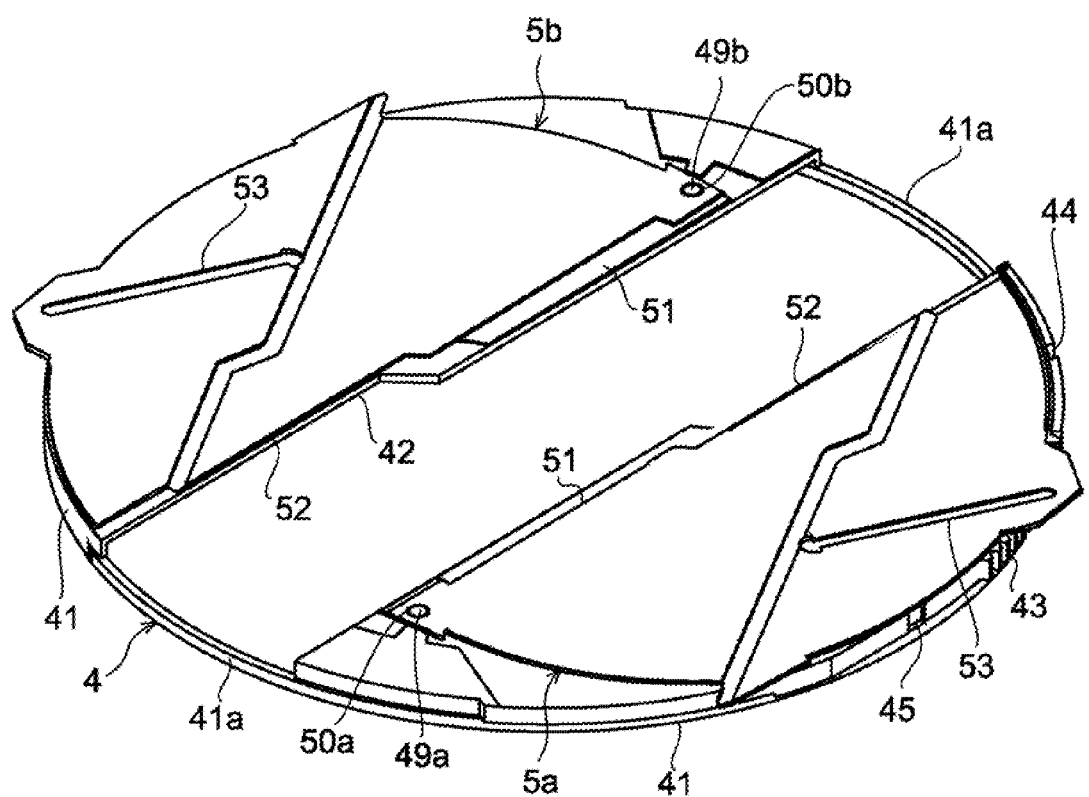
FIG. 11 A perspective view showing a state where an opening of the inner rotor is opened by the shutter.
Figure 12:
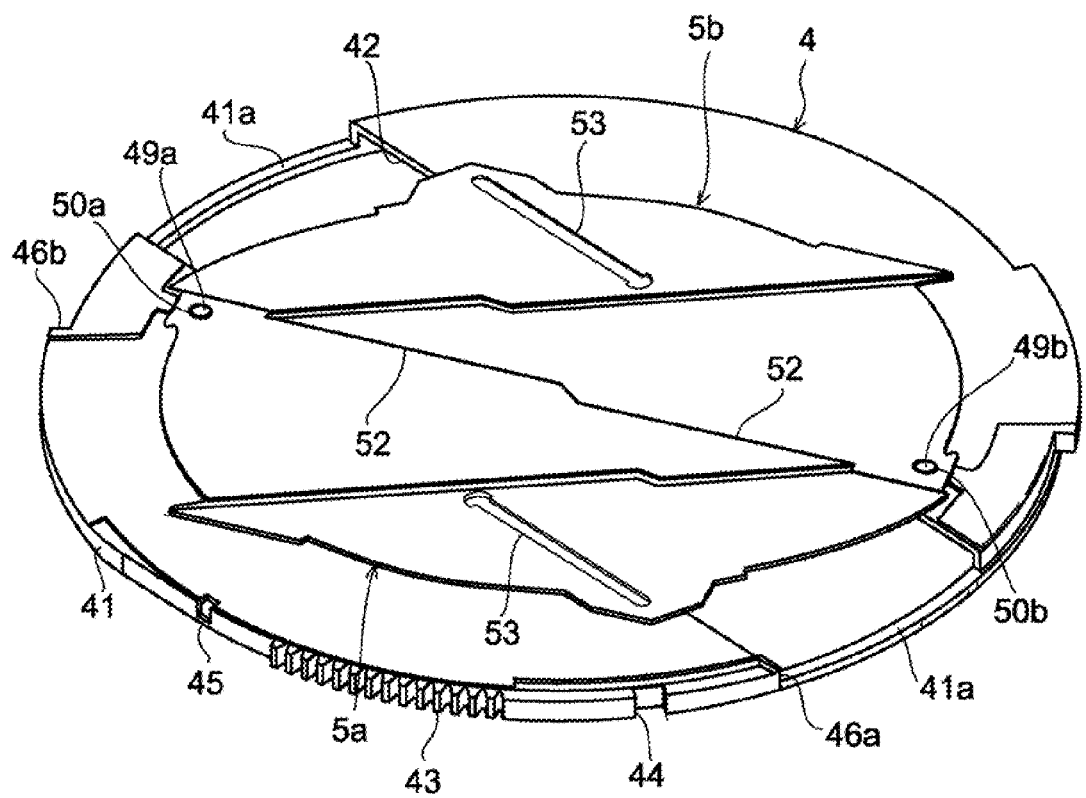
FIG. 12 A perspective view showing a state where the opening of the inner rotor is closed by the shutter.

Hereinafter, referring to FIGS. 10 to 12, details of the shutter members 5a and 5b will be described. FIG. 10 is a perspective view of the pair of shutter members 5a and 5b, FIG. 11 is a perspective view showing a state where the opening 42 of the inner rotor 4 is opened by the shutter members 5a and 5b, and FIG. 12 is a perspective view showing a state where the opening 42 of the inner rotor 4 is closed by the shutter members 5a and 5b.

The shutter members 5a and 5b constitute a "shutter" according to the present invention. The shutter members 5a and 5b are formed by injection-molding a thermoplastic resin material such as polyoxymethylene (POM) like the inner rotor 4 described above. The shutter members 5a and 5b are formed substantially as semicircular flat plates, and base end portions thereof are respectively formed with the shaft holes 50a and 50b that are rotatably engaged with the support shafts 49a and 49b of the inner rotor 4.

Moreover, at chord line parts as surfaces of the pair of shutter members 5a and 5b to be brought together, a first engagement piece 51 extending toward the base end portion from the center portion and a second engagement piece 52 extending toward a tip end portion from the center portion are formed. Among those, the lower shell 7 side of the first engagement piece 51 is a tilted surface, and the upper shell 6 side of the second engagement piece 52 is a tilted surface. As shown in FIGS. 11 and 12, by the pair of shutter members 5a and 5b respectively rotating about the support shafts 49a and 49b of the inner rotor 4 in directions to be brought close to each other, the first engagement piece 51 of the shutter member 5a and the second engagement piece 52 of the shutter member 5b are engaged with each other, and the first engagement piece 51 of the shutter member 5b and the second engagement piece 52 of the shutter member 5a are engaged with each other.

Moreover, on the shutter members 5a and 5b, the guide holes 53 that respectively engage with the pair of guide pins 32 protrusively formed on the inner surface of the lower shell 7 are formed. The guide holes 53 are formed with a predetermined length while extending from mid portions of the chord line portions toward the shaft holes 50a and 50b, respectively, so that the shutter members 5a and 5b are rotated between the closing position and opening position of the second opening 42.

Figure 13:
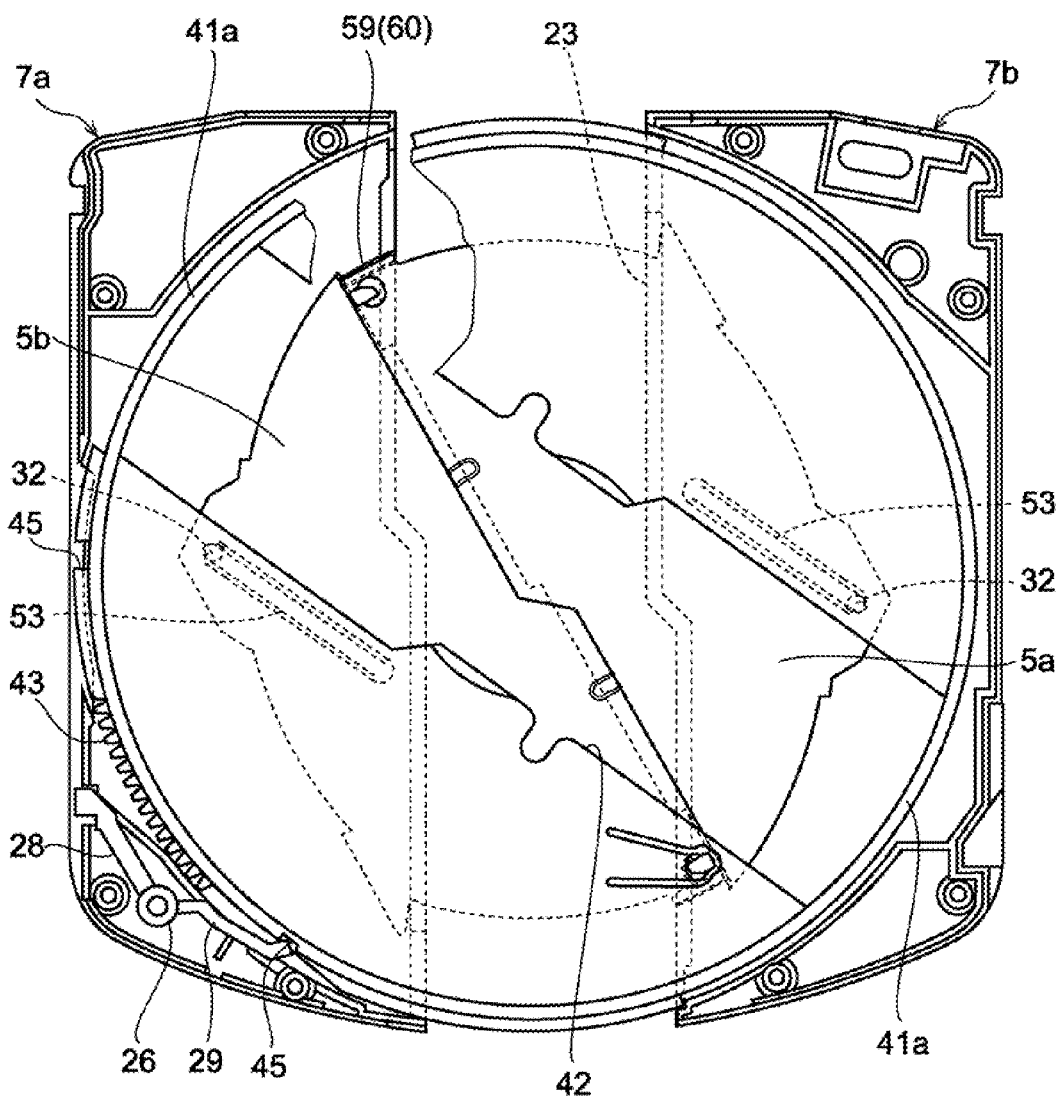
FIG. 13 A plan view of main portions inside a cartridge case, the plan view showing a state where a first opening of the cartridge case is closed.
Figure 14:
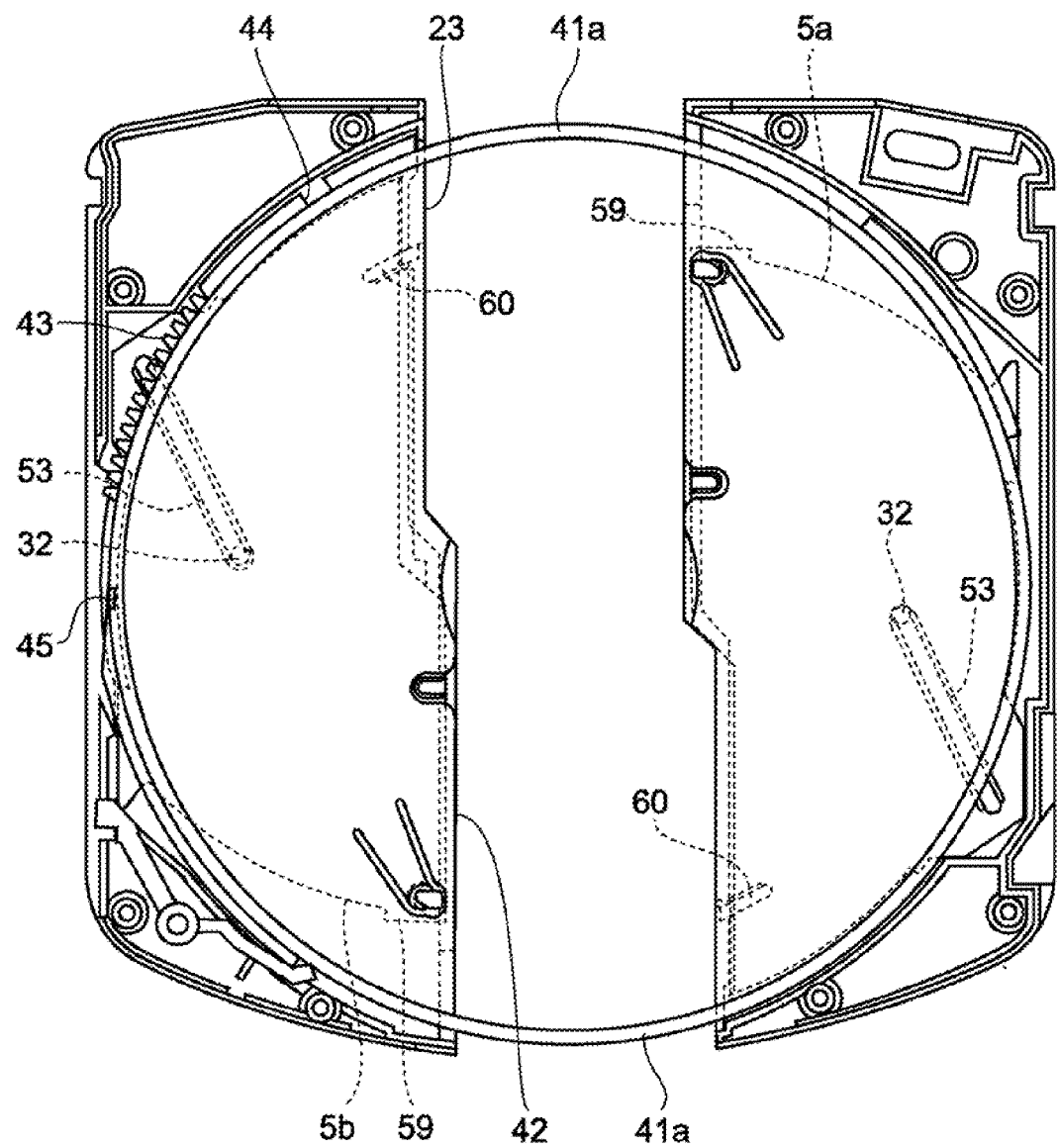
FIG. 14 A plan view of the main portions inside the cartridge case, the plan view showing a state where the first opening of the cartridge case is opened.

FIGS. 13 and 14 show relationships between the rotation of the inner rotor 4 and the opening/closing operation of the shutter members 5a and 5b. Here, FIG. 13 shows the closing position of the shutter members 5a and 5b and FIG. 14 shows the opening position of the shutter members 5a and 5b.

When the disk cartridge 1 is not used, the inner rotor 4 and the shutter members 5a and 5b are at a position shown in FIG. 13. Specifically, the rotation of the inner rotor 4 is restricted by the lock piece 29 of the lock member 26 engaging with the second engagement concave portion 45, and the shutter members 5a and 5b are positioned at the closing position to thus close the first opening 23 of the lower shell.

On the other hand, when the disk cartridge 1 is loaded in the recording/reproducing apparatus, the shutter opening member on the recording/reproducing apparatus side presses the operation piece 28 of the lock member 26 and cancels the engagement between the lock piece 29 and the second engagement concave portion 45, and thereafter engages with the first engagement concave portion 44 of the inner rotor 4. Then, the shutter opening member engages with the gear portion 43 of the inner rotor 4 along with a forwarding operation of the disk cartridge 1 with respect to the recording/reproducing apparatus, and the inner rotor 4 is rotated clockwise in FIG. 13. Due to the rotation of the inner rotor 4, the shutter members 5a and 5b supported by the support shafts 49a and 49b also move with respect to the cartridge case.

At this time, by an engagement operation of the guide pins 32 of the lower shell 7 (semi-shell bodies 7a and 7b) and the guide holes 53 of the shutter members 5a and 5b, the shutter members 5a and 5b rotate about the support shafts 49a and 49b, respectively. The rotational amount of the shutter members 5a and 5b corresponds to the rotational amount of the inner rotor 4, and at a point the inner rotor 4 has rotated to a position at which the first opening 23 and the second opening 42 practically coincide, the shutter members 5a and 5b are rotated to a position at which the first opening 23 is completely opened.

It should be noted that when taking out the disk cartridge 1 from the recording/reproducing apparatus, an operation is carried out in a reverse way. Specifically, by the inner rotor 4 rotating counterclockwise in FIG. 14 and the shutter members 5a and 5b being moved relative to the cartridge case, the first opening 23 is closed by the shutter members 5a and 5b as shown in FIG. 13. Moreover, by the lock piece 29 of the lock member 26 engaging with the second engagement concave portion 45 of the inner rotor 4, the rotation of the inner rotor 4 is restricted.

On the other hand, as shown in FIG. 10, each of the shutter members 5a and 5b is formed with a protrusion 54 on an upper surface of the first engagement piece 51. The protrusions 54 are formed at, when the shutter members 5a and 5b are engaged via the first and second engagement pieces 51 and 52, positions opposed to an inner circumferential portion (non-signal-recording area) at the center of the optical disc 3 accommodated in the disk accommodation portion 15. Accordingly, even when the shutter members 5a and 5b are deformed by an external force that acts on the shutter members 5a and 5b at a time the disk cartridge 1 that is in a state where the first opening 23 of the cartridge case 2 is closed by the shutter members 5a and 5b is not used, by bringing the protrusions 54 in contact with the inner circumferential portion of the optical disc 3, the signal recording surface of the optical disc 3 and the shutter members 5a and 5b can be prevented from being brought into contact with each other.

At a time the disk cartridge 1 that is in a state where the first opening 23 is opened is used, the protrusions 54 of the shutter members 5a and 5b are respectively accommodated in notched portions 48a and 48b formed at circumferential edges of the second opening 42 of the inner rotor 4. Accordingly, the shutter members 5a and 5b can appropriately move to the opening position.

In addition to the structure described above, the disk cartridge 1 structured as described above is provided with a clamping plate 61 at approximately a center portion of the inner surface of the upper shell 6 as shown in FIG. 2. The clamping plate 61 holds the optical disc 3 together with the disk table that constitutes the disc rotary-drive portion of the recording/reproducing apparatus and is attached to the upper shell 6 by an attachment ring 61a. Specifically, the clamping plate 61 is attached by welding, while it is sandwiched between the attachment ring 61a and approximately the center portion of the inner surface of the upper shell 6, the attachment ring 61a at approximately the center portion of the inner surface of the upper shell 6, for example. Then, by the center hole 3b engaging with the disk table and the optical disc 3 being sandwiched by the disk table and the clamping plate 61, the optical disc 3 becomes rotatable inside the disk accommodation portion 2a.

A method of fixing the semi-shell bodies 7a and 7b of the lower shell 7 to the upper shell 6 is not limited to means such as a screw described above, and it is also possible to integrally bond the upper shell 6 and the semi-shell bodies 7a and 7b of the lower shell 7 using an adhesive, ultrasonic welding, and the like.

Further, as shown in FIGS. 2 and 3, the disk cartridge 1 of this embodiment is provided with, at one of the corner portions on the rear side of the cartridge case 2, an unintentional deletion prevention mechanism 70 for preventing information signals recorded onto the optical disc 3 from being deleted unintentionally. The unintentional deletion prevention mechanism 70 includes a tab member 73 movable between a recordable position and an unrecordable position, a tab accommodation portion 72 (FIG. 4) for accommodating the tab member 73, a detection hole 74 (FIG. 3) for detecting one of a recordable state and an unrecordable state, an operation hole 75 (FIG. 4) for operating the tab member 73, and the like.

Next, a crashworthiness enhancement mechanism applied to the disk cartridge 1 of this embodiment will be described.

(Buffer Mechanism)

Figure 15:
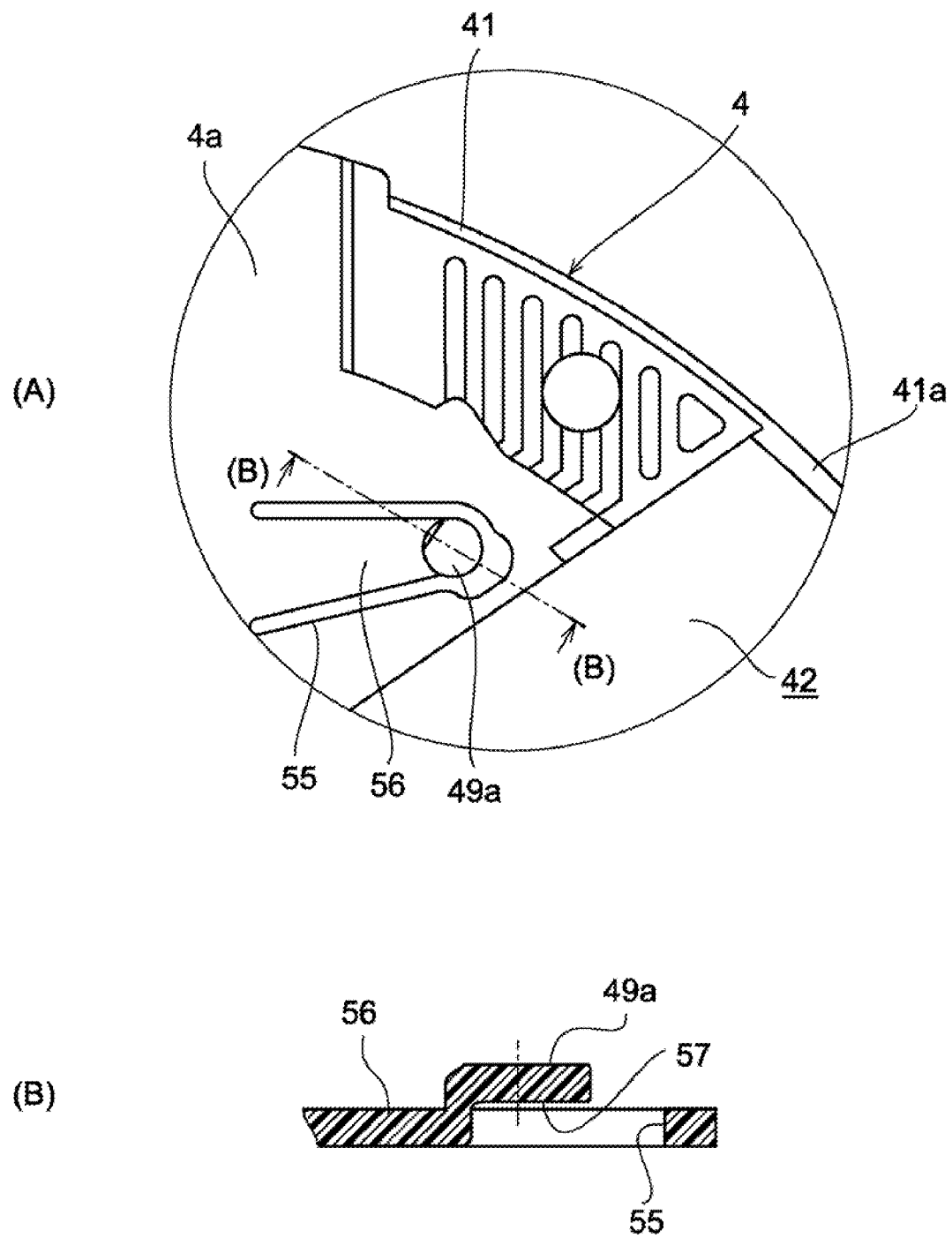
FIG. 15 Diagrams for explaining a rotational center portion of the shutter formed on the inner rotor, in which (A) is a planar surface portion and (B) is a cross-sectional diagram.

The disk cartridge 1 of this embodiment includes a buffer mechanism for elastically relieving an impact that acts on a coupling portion between the inner rotor 4 and the shutter members 5a and 5b. FIG. 15(A) is a plan view showing a portion of the inner rotor 4 at which the support shaft 49a is formed. FIG. 15(B) is a cross-sectional diagram taken along a direction of a line (B)-(B) of FIG. 15(A). Further, FIG. 16(A) is a plan view showing a portion of the shutter member 5a at which the shaft hole 50a is formed, and FIG. 16(B) is a cross-sectional diagram taken along a direction of a line (B)-(B) of FIG. 16(A). It should be noted that in descriptions below, although structures of the support shaft 49a and shaft hole 50a will be described, the support shaft 49b and the shaft hole 50b have the same structures.

The support shaft 49a is structured as a rotary shaft that rotatably supports the shutter member 5a with respect to the inner rotor 4. The support shaft 49a is integrally formed on the main surface portion 4a of the inner rotor 4 via an elastic support portion 56. As shown in FIG. 15(A), the elastic support portion 56 is sectioned from the main surface portion 4a by a slit (groove) 55 formed on the main surface portion 4a.

The elastic support portion 56 having the shape shown in the figure has an arm-like outer shape and can be elastically deformed with respect to the main surface portion 4a. The support shaft 49a is formed at a tip end portion of the elastic support portion 56.

Moreover, as shown in FIG. 15(B), a first engagement portion 57 is formed at a side circumferential portion of the support shaft 49a. The first engagement portion 57 is formed as a groove that is opened on the second opening 42 side of the inner rotor 4.

Figure 16:
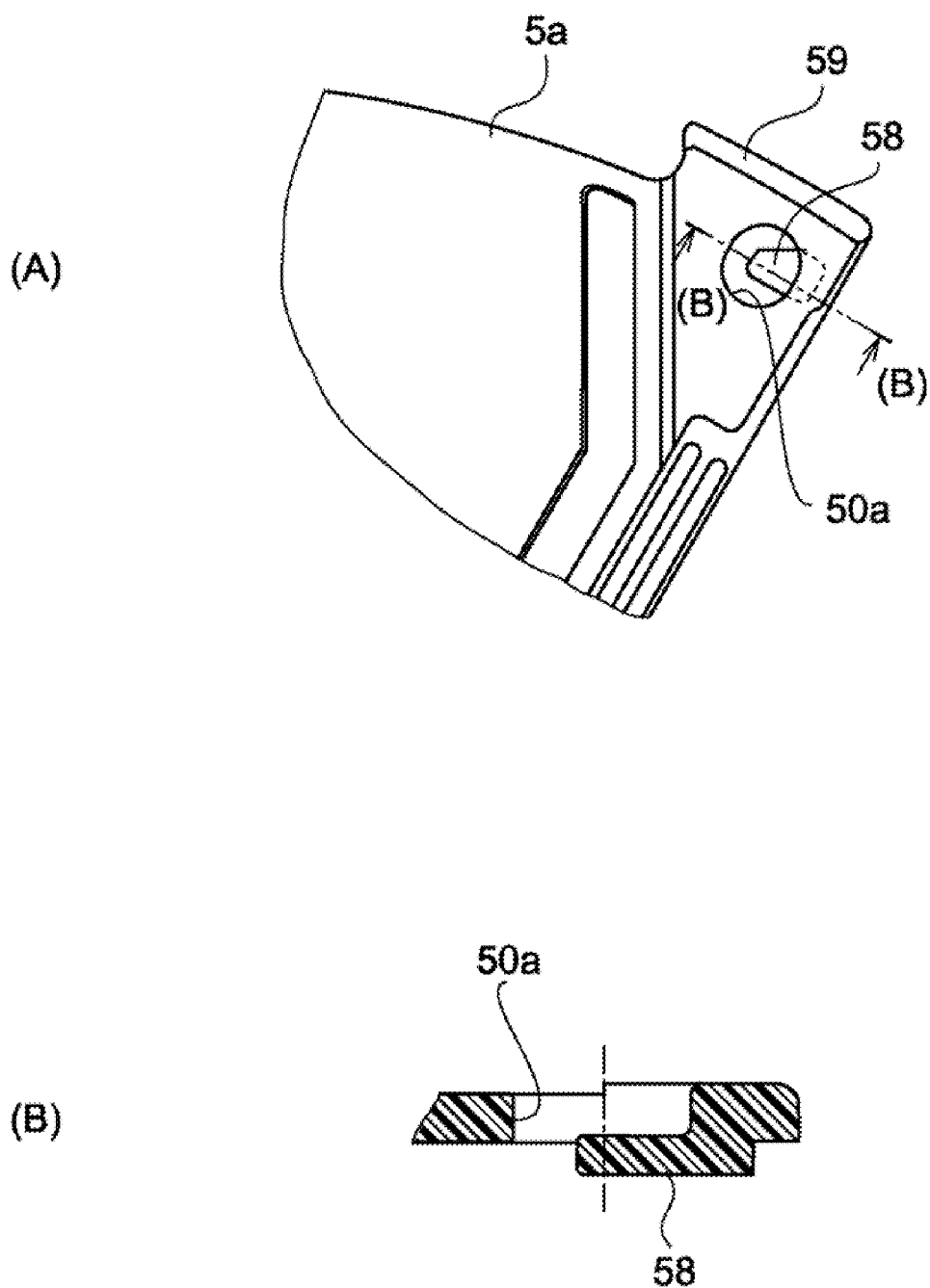
FIG. 16 Diagrams for explaining a rotational center portion formed on the shutter, in which (A) is a plan view and (B) is a cross-sectional diagram.
Figure 17:
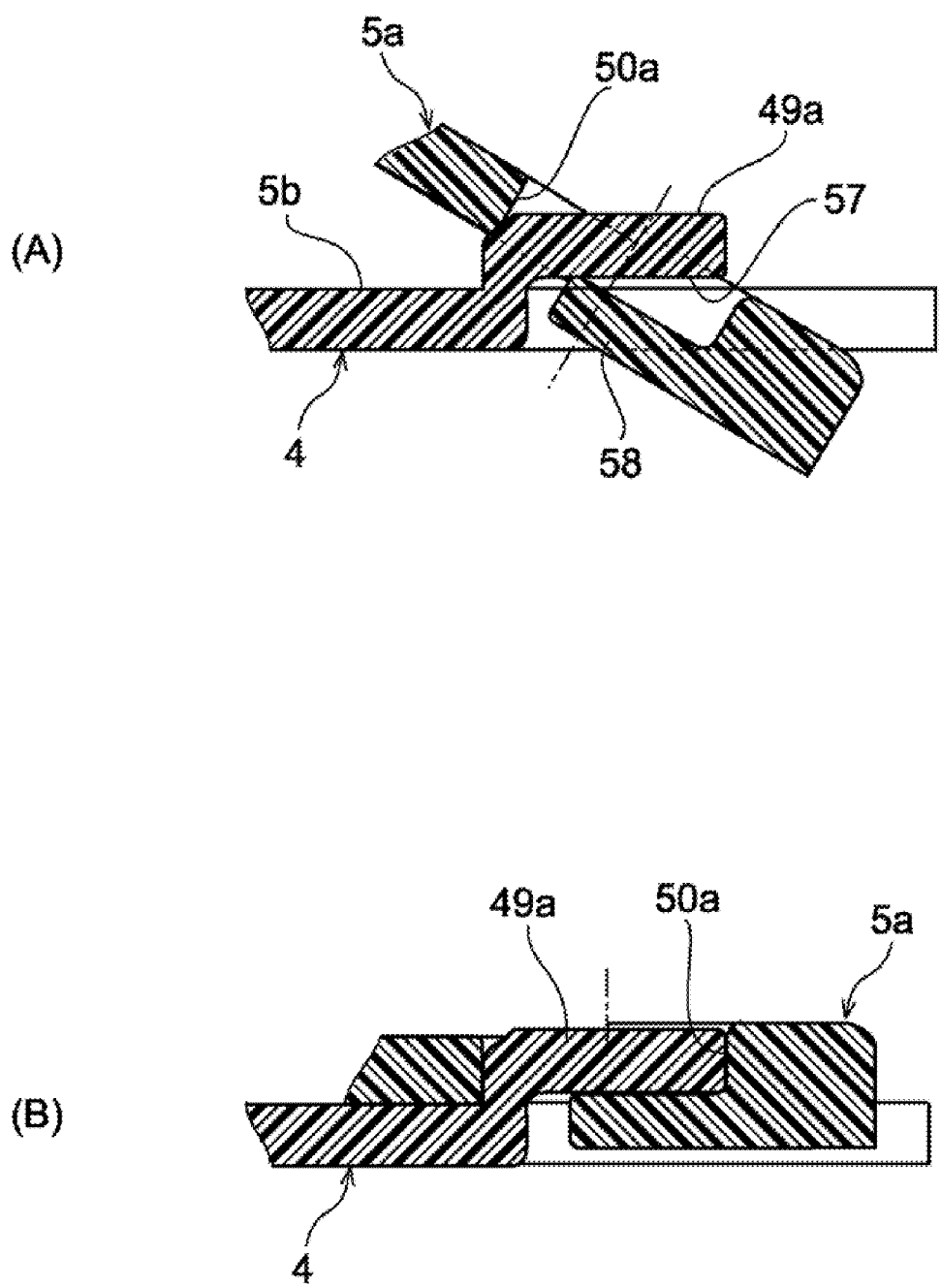
FIG. 17 Processual cross-sectional diagrams of main portions for explaining a task of fitting the shutter to the inner rotor.

On the other hand, as shown in FIG. 16, a second engagement portion 58 is formed in the shaft hole 50a of the shutter member 5a fitted to the support shaft 4a. The second engagement portion 58 is formed on an inner circumferential portion of the shaft hole 50a, specifically, formed as a protrusion protruding inwardly from the bottom portion of the shaft hole 50a. As shown in FIG. 17, the second engagement portion 58 is structured to be capable of engaging with the first engagement portion 57 formed on the support shaft 49a.

Figure 18:
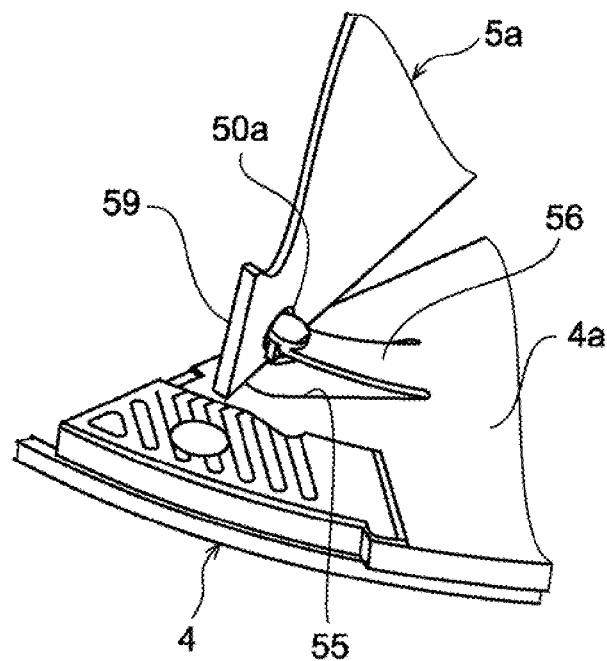
FIG. 18 A perspective view of main portions for explaining the task of fitting the shutter to the inner rotor.

FIGS. 17(A) and 17(B) are cross-sectional diagrams of main portions that show an example of fitting the second engagement portion 58 to the first engagement portion 57. FIG. 18 is a perspective view of main portions of the inner rotor 4 and the shutter member 5a during the process of FIG. 17(A). In a state where the elastic support portion 56 is elastically deformed a predetermined amount or more with respect to the main surface portion 4a and the shutter member 5a is tilted with respect to the main surface portion 4a of the inner rotor 4, the second engagement portion 58 engages with the first engagement portion 57 so as to slip under the bottom portion of the support shaft 49a.

After the engagement, the elastic support portion 56 is restored to nearly the same plane as the main surface portion 4a by its resilience, and the engagement portion between the first and second engagement portions 57 and 58 is surrounded by the main surface portion 4a. As a result, since a positional relationship between the inner rotor 4 and the shutter member 5a does not become the state as shown in FIG. 18 inside the cartridge case 2 after accommodation in the cartridge case 2, detachment of the shutter member 5a from the inner rotor 4 can positively be prevented.

The fitting of the shutter member 5a to the inner rotor 4 is thus completed. Since the method of fitting the shutter member 5b is the same as that described above, descriptions thereof will be omitted.

The buffer mechanism of the disk cartridge 1 is structured as described above. Because the support shafts 49a and 49b are elastically supported with respect to the main surface portion 4a of the inner rotor 4 due to the buffer mechanism, it becomes possible to relieve a stress applied to the coupling portion between the inner rotor 4 and the shutter members 5a and 5b when a drop impact acts thereon and thus prevent the shutter members 5a and 5b from being detached from the inner rotor 4. Accordingly, durability of the shutter opening/closing mechanism with respect to a drop impact can be enhanced, and reliability of the disk cartridge 1 can be improved.

Further, the elastic support portion 56 is integrally formed with the main surface portion 4a of the inner rotor 4 and sectioned from the main surface portion 4a by the slit 55 formed on the main surface portion 4a. With this structure, it becomes possible to easily form the elastic support portion 56 on the main surface portion 4a. It also becomes possible to impart a desired elastic force to the elastic support portion 56 depending on a way the slit 55 is formed.

Furthermore, since each of the support shafts 49a and 49b is integrally formed at the tip end portion of the elastic support portion 56, elastic deformation performance of the shutter members 5a and 5b with respect to the inner rotor 4 is improved, and an impact that acts on the support shafts 49a and 49b can be absorbed effectively.

In addition, in the above structure, in a state where the elastic support portion 56 is elastically deformed a predetermined amount or more and the shutter members 5a and 5b are tilted with respect to the main surface portion 4a of the inner rotor 4, the second engagement portion 58 is detached from the first engagement portion 57. By setting the elastic deformation amount of the elastic support portion 56 of a predetermined amount or more to be an amount exceeding a maximum deformation amount of the elastic support portion 56 inside the cartridge case 2, the engagement relationship between the first engagement portion 57 and the second engagement portion 58 can constantly be maintained after incorporating the inner rotor 4 and the shutter members 5a and 5b in the cartridge case 2.

(Engagement Mechanism)

Next, the disk cartridge 1 of this embodiment includes an engagement mechanism that is provided between the cartridge case 2 and the shutter members 5a and 5b and maintains the engaged state between the cartridge case 2 and the shutter members 5a and 5b when the shutter members 5a and 5b are positioned at the closing position.

Figure 19:
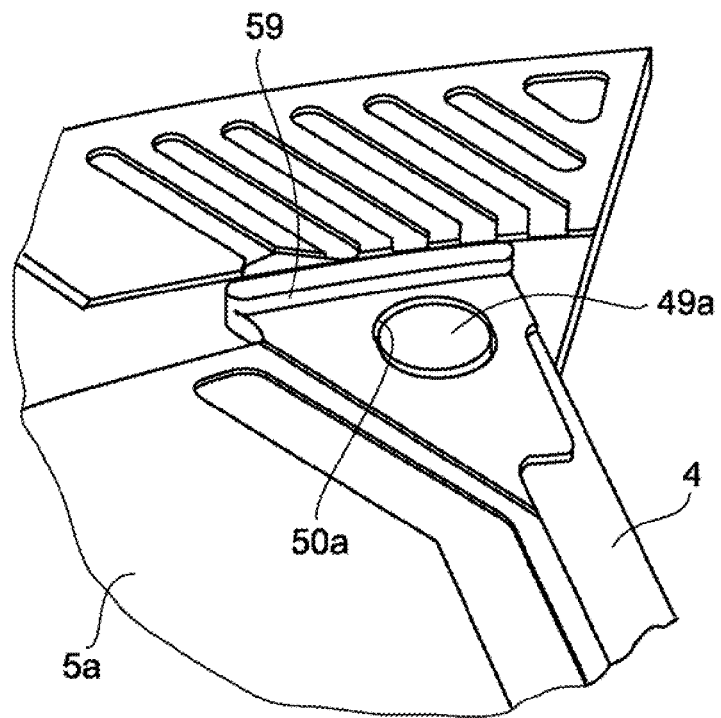
FIG. 19 A perspective view of an engagement protrusion formed in the vicinity of the rotational center portion of the shutter.

FIG. 19 is a perspective view of main portions of the shutter member 5a. In the vicinity of the shaft hole 50a as a rotational center of the shutter member 5a, an engagement protrusion 59 protruding to a side opposite to the inner rotor 4 side is formed. Further, the engagement protrusion 59 is also formed in the vicinity of a rotational center of the shutter member 5b (FIG. 14). The engagement protrusion 59 is formed in an arc shape along a trajectory of the rotation of the shutter member 5a and engages with an engagement groove 60 formed on the lower shell 7 (semi-shell bodies 7a and 7b) at the closing position at which the first opening 23 of the lower shell 7 is closed.

Figure 20:
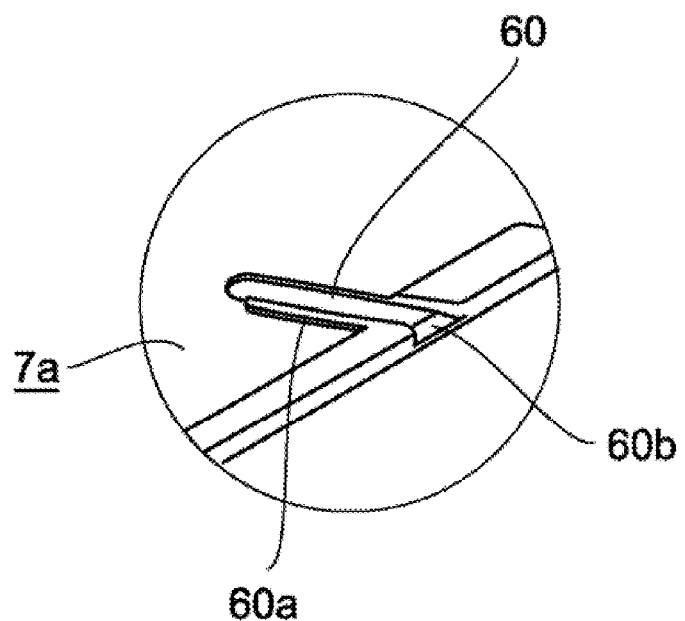
FIG. 20 A perspective view of an engagement groove that is formed on an inner surface of the cartridge case and engages with the engagement protrusion.
Figure 21:
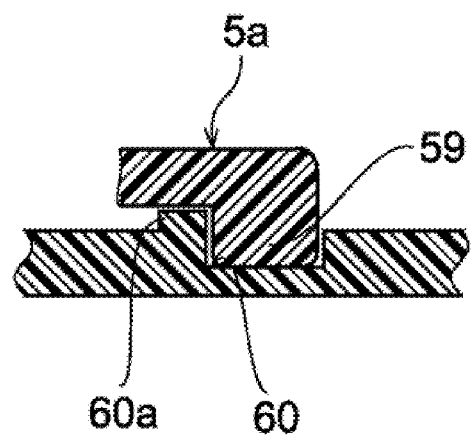
FIG. 21 A cross-sectional diagram showing an engaged state between the engagement protrusion and the engagement groove.

As shown in FIG. 5, the engagement grooves 60 are formed in an arc shape at edge portions of the opening 23 and accommodate the engagement protrusions 59 of the shutter members 5a and 5b rotated to the closing position. FIG. 20 is a perspective view of the engagement groove 60 formed on the semi-shell body 7a. FIG. 21 is a cross-sectional diagram showing an engaged state between the engagement protrusion 59 and the engagement groove 60. A rib 60a is formed at an edge portion of the engagement groove 60 on an inner circumferential side, and a height of the rib 60a from a bottom portion of the engagement groove 60 is set to be the same as a height of the engagement protrusion 59. Moreover, a tapered portion 60b is formed between the first opening 23 and the engagement groove 60 of the lower shell 7. Accordingly, it becomes easier for the engagement protrusion 59 to enter the engagement groove 60 when the shutter members 5a and 5b are rotated to the closing position.

The engagement mechanism of the disk cartridge 1 is structured as described above. In this embodiment, due to the engagement mechanism, the engaged state between the cartridge case 2 and the shutter members 5a and 5b is maintained when the shutter members 5a and 5b are at the closing position at which the first opening 23 is closed.

Accordingly, since a relative movement of the shutter members 5a and 5b with respect to the cartridge case 2 is restricted when a drop impact occurs, a stress applied to the support shafts 49a and 49b pivotally supporting the shutter members 5a and 5b can be reduced, and the shutter members 5a and 5b can be prevented from being detached from the inner rotor 4. In addition, durability of the shutter opening/closing mechanism with respect to a drop impact can be enhanced, and reliability of the disk cartridge 1 can be improved. Moreover, because the engagement protrusions 59 are respectively formed in the vicinity of the support shafts 49a and 49b, it becomes possible to stop the drop impact in the vicinity of the support shafts 49a and 49b and effectively protect the support shafts 49a and 49b from the drop impact.

Because the engagement grooves 50 are formed locally at the edge portions of the first opening 23 of the lower shell 7, the engaged state between the cartridge case 2 and the shutter members 5a and 5b is canceled while the shutter members 5a and 5b move to the opening position from the closing position. Accordingly, a special mechanism does not need to be provided for canceling the engagement between the cartridge case 2 and the shutter members 5a and 5b, and it becomes possible to execute the engagement with respect to the cartridge case 2 and the cancel of the engagement with respect to the cartridge case 2 by a normal rotation operation of the shutter members 5a and 5b.

Further, the support shafts 49a and 49b can be effectively protected from a drop impact by a combination with the operation of the buffer mechanism described above, thus resulting in an additional improvement in reliability of the shutter opening/closing mechanism. Furthermore, by the engagement structure of the support shafts 49a and 49b and the shaft holes 50a and 50b, it becomes possible to positively prevent the shutter members 5a and 5b from being detached from the inner rotor 4.

In the above embodiment, the disk cartridge 1 in which the first opening 23 is formed across the cartridge case 2 from the foreside to the rear side has been exemplified. Alternatively, the present invention is also applicable to a disk cartridge in which a first opening is formed from a center portion of the cartridge case 2 to a rear side thereof.

Moreover, the example in which the rotary shafts (support shafts 49a and 49b) and the elastic support portions 56 are structured on the main surface portion 4a of the inner rotor 4 as the buffer mechanism for elastically supporting the rotary shafts that rotatably support the shutter members 5a and 5b with respect to the inner rotor 4 has been described. However, the rotary shafts and the elastic support portions may instead be structured on a main surface portion side of the shutter members 5a and 5b. This case also bears the same effect.

Further, as the buffer mechanism, instead of the elastic support portion 56, an elastic plate formed of rubber and the like may be provided between the main surface portion of the inner rotor and the rotary shaft, for example.

On the other hand, the example in which the engagement protrusions 59 are provided on the shutter members 5a and 5b side and the engagement grooves 60 are provided on the lower shell 7 side as the engagement mechanism for causing the shutter members 5a and 5b to engage with the cartridge case 2 at the closing position of the shutter members 5a and 5b has been described. However, the engagement protrusions may instead be provided on the lower shell side and the engagement grooves may instead be provided on the shutter members side.

Furthermore, the engagement mechanism is not limited to the example of being formed in the vicinity of the support shafts 49a and 49b and may be provided at other portions, or an engagement portion for the lower shell and the cartridge case may by provided at other portions in addition to those in the vicinity of the support shafts 49a and 49b.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A disk cartridge comprising:
a disk-like recording medium;
a cartridge case that rotatably accommodates the disk-like recording medium and is formed with a first opening that exposes a part of the disk-like recording medium;
an inner rotor that is rotatably supported inside the cartridge case and includes a main surface portion formed with a second opening corresponding to the first opening;
a shutter that is movable between a closing position at which the first opening is closed and an opening position at which the first opening is opened in accordance with a rotation of the inner rotor; and
a buffer mechanism including a rotary shaft that rotatably supports the shutter and an elastic support portion that supports the rotary shaft and can be elastically deformed with respect to the main surface portion by a slit integrally farmed with the main surface portion on the main surface portion.

2. The disk cartridge according to claim 1,
wherein the rotary shaft is integrally formed with the elastic support portion at a tip end thereof.

3. The disk cartridge according to claim 2,
wherein the rotary shaft includes a first engagement portion, and
wherein the shutter includes a second engagement portion that is capable of engaging with the first engagement portion and being detached from the first engagement portion in a state where the elastic support portion is elastically deformed a predetermined amount or more.

4. The disk cartridge according to claim 3,
wherein the second engagement portion is formed on an inner circumferential portion of a hole into which the rotary shaft is inserted.

5. A disk cartridge, comprising:
a disk-like recording medium;
a cartridge case that rotatably accommodates the disk-like recording medium and is formed with a first opening that exposes a part of the disk-like recording medium;
an inner rotor that is rotatably supported inside the cartridge case and includes a main surface portion formed with a second opening corresponding to the first opening;
a buffer mechanism including a rotary shaft that includes a first engagement portion and an elastic support portion that supports the rotary shaft and can be elastically deformed with respect to the main surface portion by a slit integrally formed with the main surface portion on the main surface portion; and
a pair of shutter members that are rotatable between a closing position at which the pair of shutter members close the first opening by being brought close to each other and an opening position at which the pair of shutter members open the first opening by being set apart from each other in accordance with a rotation of the inner rotor, the pair of shutter members each including a second engagement portion that is capable of engaging with the first engagement portion and being detached from the first engagement portion in a state where the elastic support portion is elastically deformed a predetermined amount or more.

6. The disk cartridge according to claim 5,
wherein the second engagement portion is detached from the first engagement portion in a state where the shutter members are tilted with respect to the main surface portion of the inner rotor.

7. A disk cartridge, comprising:
a disk-like recording medium;
a cartridge case that rotatably accommodates the disk-like recording medium and is formed with a first opening that exposes a part of the disk-like recording medium;
an inner rotor that is rotatably supported inside the cartridge case and includes a main surface portion formed with a second opening corresponding to the first opening;
a shutter that is movable between a closing position at which the first opening is closed and an opening position at which the first opening is opened in accordance with a rotation of the inner rotor;
a buffer mechanism that is formed on the main surface portion of the inner rotor and includes a rotary shaft that rotatably supports the shutter and an elastic support portion that supports the rotary shaft and can be elastically deformed with respect to the main surface portion; and
an engagement mechanism that is provided between the cartridge case and the shutter and maintains an engaged state between the cartridge case and the shutter when the shutter is positioned at the closing position.

8. The disk cartridge according to claim 7,
wherein the engagement mechanism cancels the engaged state between the cartridge case and the shutter while the shutter moves to the opening position from the closing position.

9. The disk cartridge according to claim 8,
wherein the engagement mechanism includes
an arc-shaped engagement protrusion that is formed on the shutter in correspondence with a rotational direction of the shutter, and
an arc-shaped engagement groove that is formed at an edge portion of the first opening and capable of accommodating the engagement protrusion.

10. The disk cartridge according to claim 9,
wherein the engagement protrusion is provided in the vicinity of a rotational center of the shutter with respect to the inner rotor.

11. A disk cartridge, comprising:
a disk-like recording medium;
a cartridge case that includes a guide groove, rotatably accommodates the disk-like recording medium, and is formed with a first opening that exposes a part of the disk-like recording medium;
an inner rotor that includes a main surface portion, a toric circumferential wall portion formed on one surface of the main surface portion, a second opening that is formed on the main surface portion and has a shape corresponding to that of the first opening, and a coupling portion that is positioned at a portion where the second opening is formed in a part of the circumferential wall portion and includes a first end surface on the main surface portion side, that is formed with a first width, and a second end surface on the other side of the main surface portion, that is formed with a second width smaller than the first width, the coupling portion on the second end surface side being slidably engaged with the guide groove so that a rotation of the inner rotor with respect to the cartridge case is guided;
a shutter that is movable between a closing position at which the first opening is closed and an opening position at which the first opening is opened in accordance with the rotation of the inner rotor; and a buffer mechanism that is formed on the main surface portion of the inner rotor and includes a rotary shaft that rotatably supports the shutter and an elastic support portion that supports the rotary shaft and can be elastically deformed with respect to the main surface portion.

12. The disk cartridge according to claim 11, wherein the guide groove has an inner surface configuration corresponding to an outer surface configuration of the coupling portion.

13. The disk cartridge according to claim 12, wherein the coupling portion includes an outer circumferential surface and an inner circumferential surface, and wherein at least one of the outer circumferential surface and the inner circumferential surface is tapered.

14. The disk cartridge according to claim 12, wherein the coupling portion includes an outer circumferential surface and an inner circumferential surface, and wherein at least one of the outer circumferential surface and the inner circumferential surface is formed as a curved surface.

15. The disk cartridge according to claim 11, wherein the guide groove is formed to be toric to thus engage with the circumferential wall portion and the coupling portion of the inner rotor.

16. The disk cartridge according to claim 11, wherein the second opening is formed across an entire area of the main surface portion in a diametrical direction.

* * * * *